(12) United States Patent
Kudou

(10) Patent No.: US 7,982,978 B2
(45) Date of Patent: Jul. 19, 2011

(54) IMAGING LENS

(75) Inventor: Akihito Kudou, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 125 days.

(21) Appl. No.: 12/484,545

(22) Filed: Jun. 15, 2009

(65) Prior Publication Data

US 2009/0310232 A1    Dec. 17, 2009

(30) Foreign Application Priority Data

Jun. 16, 2008  (JP) ................................. 2008-156614
Apr. 16, 2009  (JP) ................................. 2009-100022

(51) Int. Cl.
*G02B 9/14* (2006.01)
(52) U.S. Cl. ..................... 359/786; 359/716; 359/740
(58) Field of Classification Search .................. 359/786, 359/716, 740
See application file for complete search history.

(56) References Cited

U.S. PATENT DOCUMENTS

2002/0181121 A1   12/2002  Kawakami
2003/0184883 A1   10/2003  Sato et al.
2006/0119958 A1   6/2006   Jeong
2008/0174885 A1*  7/2008   Choi et al. ................... 359/716

FOREIGN PATENT DOCUMENTS

| JP | 2002-228922 A | 8/2002 |
| JP | 2006-98976 A | 4/2006 |
| JP | 2006-163340 A | 6/2006 |
| JP | 2006-284620 A | 10/2006 |

* cited by examiner

*Primary Examiner* — Evelyn A. Lester
(74) *Attorney, Agent, or Firm* — Foley & Lardner LLP

(57) ABSTRACT

An imaging lens includes a first lens group that includes sequentially from an object side, a first lens formed of resin and having a positive refractive power and a second lens formed of resin and having a negative refractive power, the first lens and the second lens collectively forming a cemented lens having a positive refractive power. The imaging lens further includes a second lens group that includes a negative lens having a convex surface directed toward an image plane and a third lens group that includes a positive lens, where the first lens group, the second lens group, and the third lens groups are sequentially arranged from the object side.

8 Claims, 29 Drawing Sheets

SPHERICAL ABERRATION

SPHERICAL ABERRATION

SPHERICAL ABERRATION

SPHERICAL ABERRATION

IMAGING LENS

BACKGROUND OF THE INVENTION

1. Field of the Invention

The present invention relates to an imaging lens, suitable for an imaging device equipped with solid imaging elements.

2. Description of the Related Art

In recent years, the prevalence of portable electronic imaging devices, such as cellular phones, digital cameras and the like, has been spreading widely. Recent reductions in the size of electronic imaging devices has lead to demand for smaller imaging lenses equipped on electronic imaging devices. In response to such demand, numerous imaging lenses have been proposed, such as those disclosed in Japanese Patent Application Laid-Open Publication Nos. 2006-163340; 2006-284620; 2002-228922; and 2006-98976.

The imaging lens disclosed in Japanese Patent Application Laid-Open Publication No. 2006-163340 includes three lenses arranged in three groups and employs only lenses made of a plastic material. The imaging lens disclosed in Japanese Patent Application Laid-Open Publication No. 2006-284620 is a wide angle lens realizing fine chromatic aberration correction by cementing lenses made of a plastic material. The imaging lens disclosed in Japanese Patent Application Laid-Open Publication No. 2002-228922 is a lens realizing fine chromatic aberration correction by cementing lenses made of a glass material. Further, the imaging lens disclosed in Japanese Patent Application Laid-Open Publication No. 2006-98976 is a lens that incorporates a low dispersion glass in a first lens group to realize fine chromatic aberration correction.

Recent demand for higher image quality has accelerated advances in high pixel formation of imaging elements. In general, high pixel formation of an imaging element is achieved by minimizing the cell size thereof or by enlarging the imaging element. However, in the former case, light intensity deteriorates, and in the latter case, chromatic aberration can not be easily corrected because the focal length of the imaging lens has to be lengthened.

Although a lens formed of a low dispersion glass material, such as the lens as disclosed in Japanese Patent Application Laid-Open Publication No. 2006-98976, may overcome such problems, the production cost of the imaging lens increases since the low dispersion glass material is expensive. Also, there is a problem of increased weight resulting from the use of glass material. With respect to the imaging lens disclosed in Japanese Patent Application Laid-Open Publication No. 2002-228922, although use of a low dispersion glass material in a cemented lens enables correction of chromatic aberration, problems similar to those associated with the imaging lens disclosed in Japanese Patent Application Laid-Open Publication No. 2006-98976 arise.

Meanwhile, with the imaging lenses respectively disclosed in Japanese Patent Application Laid-Open Publication Nos. 2006-163340 and 2006-284620, the range of choice concerning refractive index/dispersion ratio is narrow for resin materials, making correction of chromatic aberration caused by high pixel formation of the imaging element difficult.

In order to overcome the problems of above mentioned prior arts, an object of the present invention is to provide a small, low-cost, and light-weight imaging lens having high optical performance satisfying high pixel formation of imaging element, even when inclusive of a lens formed of resin.

SUMMARY OF THE INVENTION

It is an object of the present invention to at least solve the above problems in the conventional technologies.

An imaging lens according to one aspect of the present invention includes a first lens group that includes sequentially from an object side, a first lens formed of resin and having a positive refractive power and a second lens formed of resin and having a negative refractive power, the first lens and the second lens collectively forming a cemented lens having a positive refractive power. The imaging lens further includes a second lens group that includes a negative lens having a convex surface directed toward an image plane and a third lens group that includes a positive lens, where the first lens group, the second lens group, and the third lens groups are sequentially arranged from the object side.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Figure 1:
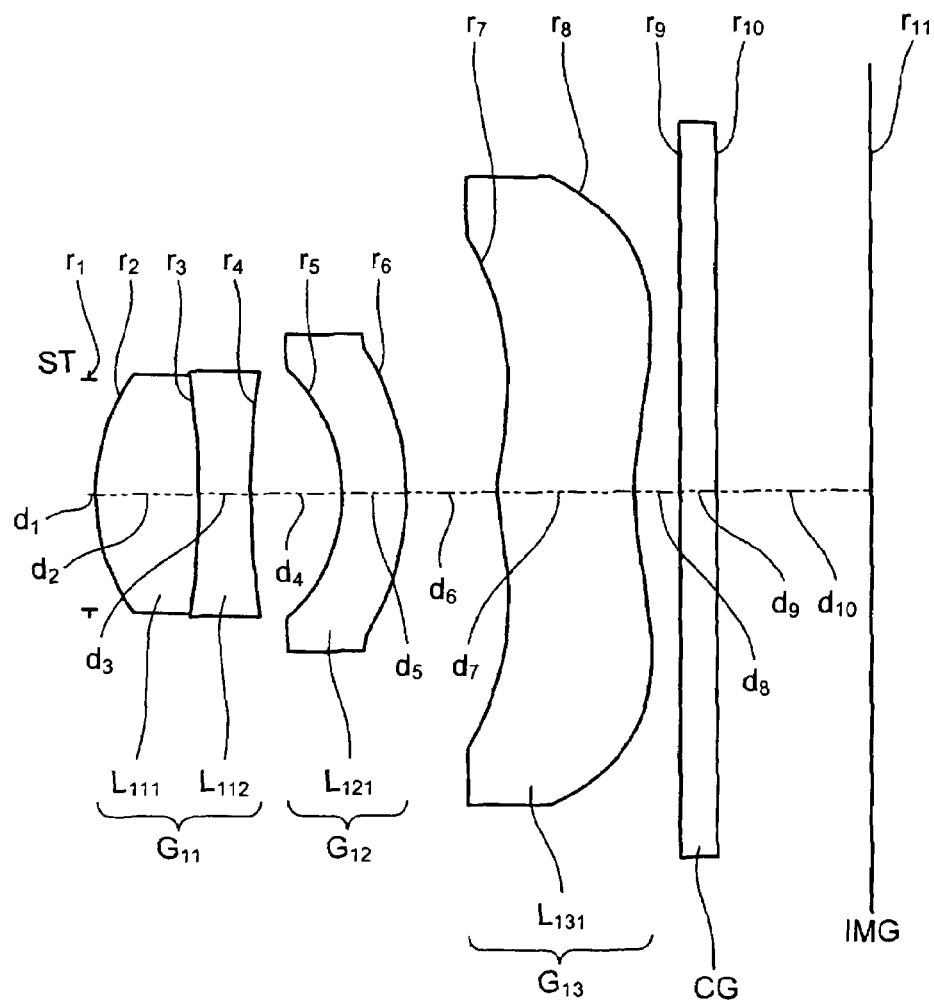
FIG. 1 is a cross-sectional view along the optical axis of an imaging lens according to a first embodiment.

With reference to the accompanying drawings, exemplary embodiments according to the present invention are explained in detail below.

An imaging lens according to embodiments of the present invention includes sequentially from an object side, a first lens group, a second lens group and a third lens group. The first lens group includes sequentially from the object side, a first lens formed of resin and having a positive refractive power, and second lens formed of resin and having a negative refractive power, the first lens and the second lens collectively forming a cemented lens having a positive refractive power. The second lens group includes a negative lens. The third lens group includes a positive lens. Further, the imaging lens includes a diaphragm aperture of a given caliber provided close to an object-side surface of the first lens group or between the first lens group and the second lens group.

The imaging lens according to the present embodiments is a small, low-cost, and light-weight imaging lens having high optical performance that satisfies high pixel formation of an imaging element, even when inclusive of a lens formed of resin.

The imaging lens according to the present embodiments may be applied to an electronic imaging apparatus having an imaging element. An object of the present invention is to provide an imaging lens of a smaller size and higher optical performance in response to recent advancements in high pixel formation of imaging elements and reductions in device size. To this means, the following conditions are provided in addition to the arrangement described.

For the imaging lens according to the present embodiments, it is preferable to satisfy the following conditional expression, where $f_1$ is the focal length of the first lens group, and f is the focal length of the imaging lens.

$$0.5 < f_1/f < 1.0 \tag{1}$$

Conditional expression (1) provides the ratio of focal length of the imaging lens and the focal length of the first lens group. By satisfying conditional expression (1), aberration can be effectively corrected. Beyond the lower limit of conditional expression (1), image distortion increases or spherical aberration and coma aberration becomes obvious. On the other hand, exceeding the upper limit of conditional expression (1) is not preferable because large chromatic aberration occurs.

Further, for the imaging lens according to the present embodiments, it is preferable to satisfy the following conditional expression, where the focal length of the first lens of the first lens group is $f_{11}$, and the focal length of the second lens of the first lens group is $f_{12}$.

$$0.3 < |f_{11}/f_{12}| < 1.0 \tag{2}$$

Conditional expression (2) provides the absolute value of the ratio of focal length of the second lens of the first lens group to the focal length of the first lens of the first lens group. By satisfying conditional expression (2), increase and decrease of the spherical aberration can be controlled. If the value of $|f_{11}/f_{12}|$ is outside the range specified by conditional expression (2), spherical aberration cannot be sufficiently corrected.

Further, for the imaging lens according to the present embodiments, it is preferable to satisfy the following conditional expression, where the refractive index in d-line of the first lens of the first lens group is $n_1$, and the refractive index of d-line of the second lens of the first lens group is $n_2$.

$$0 < n_2 - n_1 \tag{3}$$

Conditional expression (3) provides the difference between the refractive index in d-line of the second lens of the first lens group, and the refractive index of d-line of the first lens of the first lens group. By satisfying conditional expression (3), aberration can be effectively corrected. For values below the lower limit of conditional expression (3), aberration correction becomes difficult and such values are not desirable.

Further, for the imaging lens according to the present embodiments, it is preferable to satisfy the following conditional expression, where OP is an overall length of the imaging lens (the distance from an object-side surface of the imaging lens nearest an object to the image plane), and 2Y is the diameter of effective image circle of the imaging lens.

$$OP/2Y < 2.0 \tag{4}$$

Conditional expression (4) provides the ratio of diameter of effective image circle and the overall length of the imaging lens. Satisfaction of conditional expression (4) enables provision of a smaller imaging lens having a shorter overall length. Exceeding the upper limit of conditional expression (4) is not preferable as the overall length of the imaging lens becomes too long.

The imaging lens according to the present embodiments will have higher optical performance and be smaller in size by satisfying conditional expressions (1) to (4) sequentially. It is preferable; however, to satisfy conditional expressions (2) and (3) at the same time.

Further, the imaging lens according to the present embodiments preferably includes at least one aspherical surface. Thereby, various aberrations can be corrected more effectively by fewer lenses, while achieving reductions in the size and weight of the optical system as well as in production costs. Further, forming the second lens group and/or the third lens group of resin enables provision of an imaging lens that is lower in cost and lighter.

The imaging lens according to the present invention has the characteristics explained above and enables provision of a small, low-cost, and light-weight imaging lens having high optical performance satisfying the high pixel formation of an imaging element, even when inclusive of a lens formed of resin. Further, the imaging lens includes an aspherical lens, thus, various aberrations can be corrected more effectively by fewer lenses, while achieving reductions in the size and weight of the optical system and in production costs.

FIG. 1 is a cross-sectional view along the optical axis of an imaging lens according to a first embodiment. The imaging lens includes sequentially from an object side which is not illustrated, a first lens group $G_{11}$, a second lens group $G_{12}$, and a third lens group $G_{13}$. Further, an aperture ST of a given diameter is provided close to an object-side surface of the first lens group $G_{11}$. A cover glass CG formed by a parallel plate is arranged between the third lens group $G_{13}$ and an image plane IMG. Further, an optical receiving surface of an imaging element such as a charge-coupled device (CCD) or a complementary metal oxide semiconductor (CMOS) is arranged on the image plane IMG.

The first lens group $G_{11}$ includes sequentially from the object side, a first lens $L_{111}$ formed of resin and having a positive refractive power and a second lens $L_{112}$ formed of resin and having a negative refractive power, collectively forming a cemented lens having a positive refractive power.

The second lens group $G_{12}$ includes a negative meniscus lens $L_{121}$, whose convex surface is directed toward the image plane IMG. Further, the lens $L_{121}$ is preferably formed of resin.

The third lens group $G_{13}$ includes a positive meniscus lens $L_{131}$, whose convex surface is directed toward the object side. Further, the lens $L_{131}$ is preferably formed of resin.

The object-side surface of the first lens $L_{111}$, the image-plane-IMG-side surface of the second lens $L_{112}$, both surfaces of the lens $L_{121}$, and both surfaces of the lens $L_{131}$ are aspherical.

Values concerning the imaging lens according to first embodiment are given below.
The focal length of the imaging lens (f)=5.85
The F number=2.92
The diameter of the effective image circle of the imaging lens (2Y)=7.40
The focal length of the first lens group $G_{11}$ ($f_1$)=4.856
The focal length of the first lens $L_{111}$ of the first lens group $G_{11}$ ($f_{11}$)=2.802
The focal length of the second lens $L_{112}$ of the first lens group $G_{11}$ ($f_{12}$)=−5.262
The refractive index of d-line of the first lens $L_{111}$ of the first lens group $G_{11}$ ($n_1$)=1.525
The refractive index of d-line of the second lens $L_{112}$ of the first lens group $G_{11}$ ($n_2$)=1.586

(Values concerning conditional expression 1)

$$f_1/f=0.832$$

(Values concerning conditional expression 2)

$$|f_{11}/f_{12}|=0.532$$

(Values concerning conditional expression 3)

$$n_2-n_1=0.061$$

(Values concerning conditional expression 4)

$$OP/2Y=0.87$$

Figure 2:
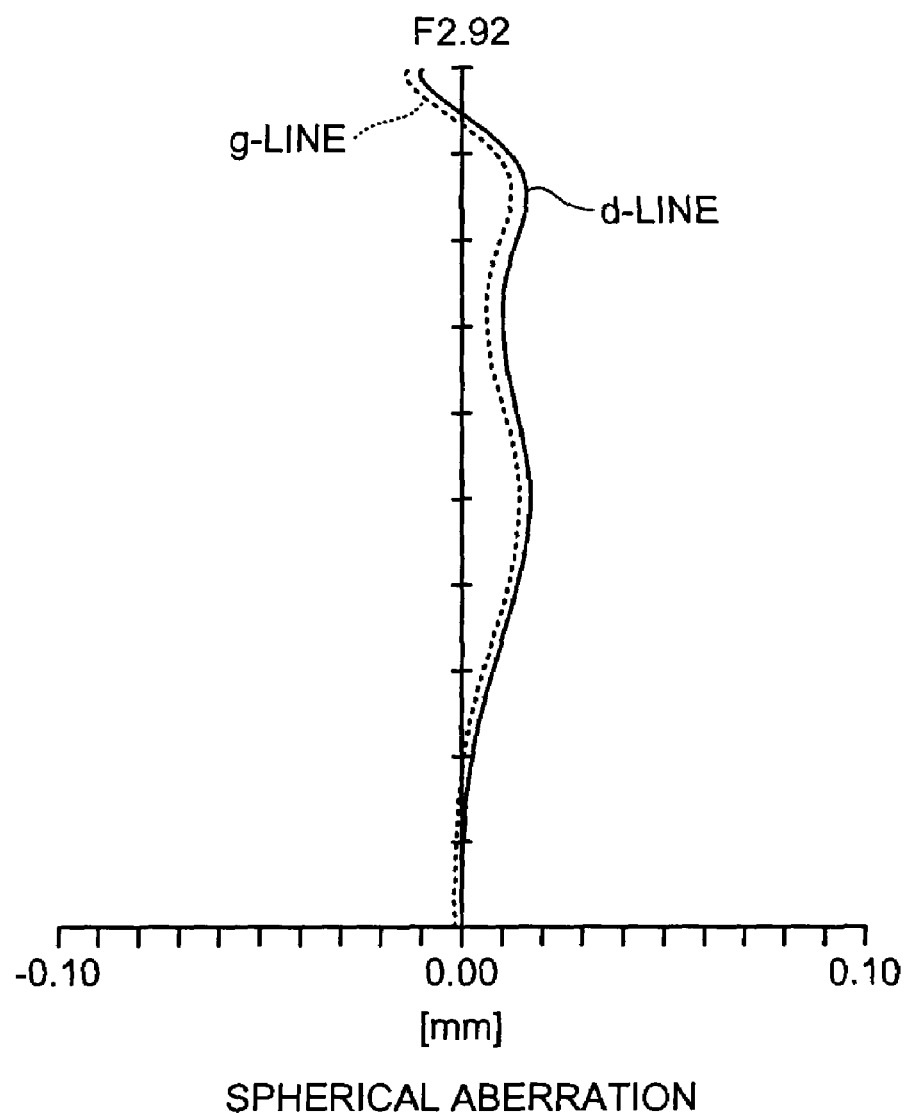
FIG. 2 is a spherical aberration diagram of the image lens according to the first embodiment.
Figure 3:
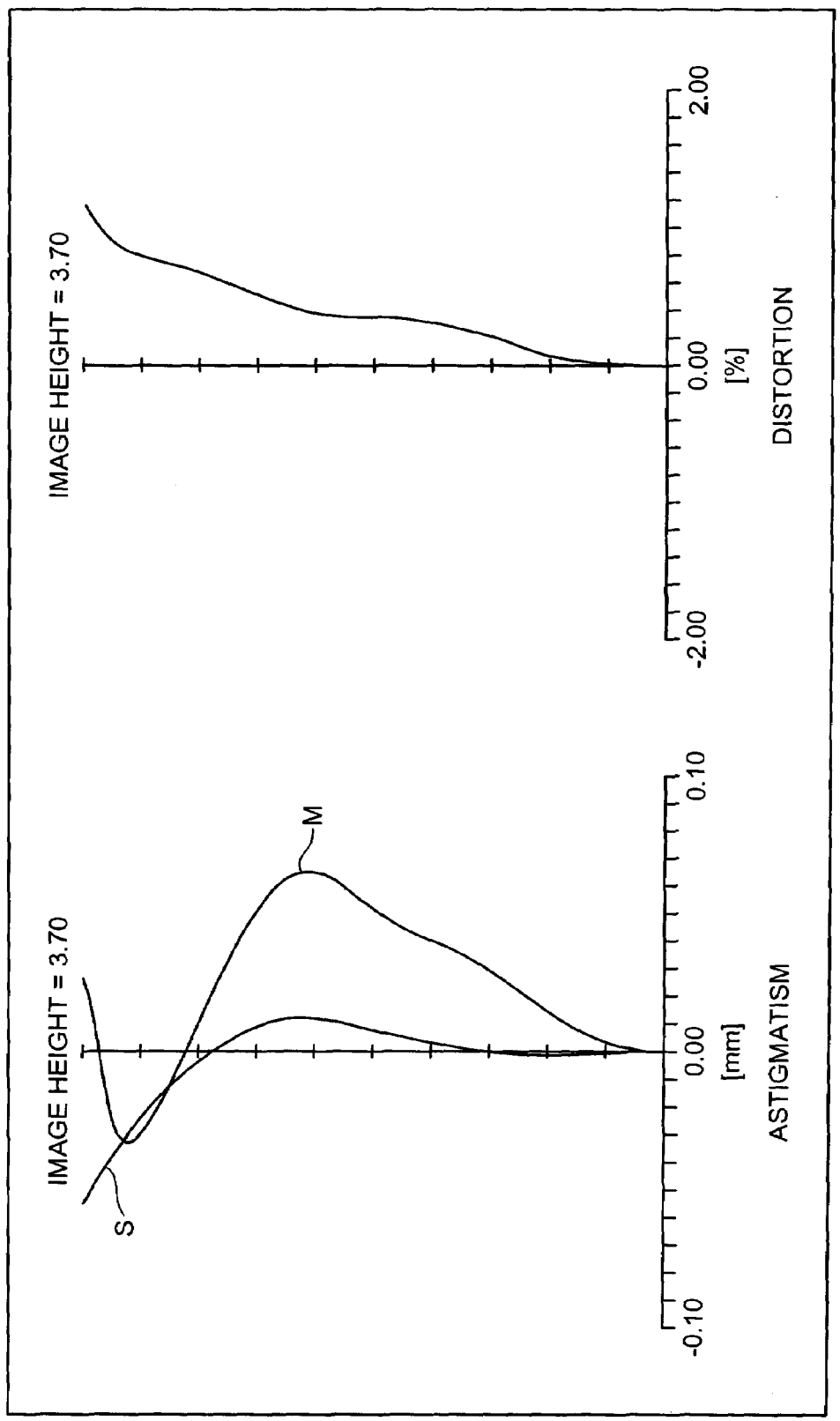
FIG. 3 is an astigmatism diagram in d-line ($\lambda$=587.56 nm) and a distortion diagram of the imaging lens according to the first embodiment.

$r_1=\infty$ (diaphragm aperture)
$\quad d_1=0$
$r_2=1.85380$ (aspherical surface)
$\quad d_2=0.871$ $nd_1=1.525$ $vd_1=56.2$
$r_3=-5.98934$
$\quad d_3=0.41$ $nd_2=1.586$ $vd_2=29.9$
$r_4=6.45573$ (aspherical surface)
$\quad d_4=0.756$
$r_5=-2.08317$ (aspherical surface)
$\quad d_5=0.537$ $nd_3=1.586$ $vd_3=29.9$
$r_6=-3.44932$ (aspherical surface)
$\quad d_6=0.755$
$r_7=2.54213$ (aspherical surface)
$\quad d_7=1.117$ $nd_4=1.525$ $v_4=56.2$
$r_8=2.50984$ (aspherical surface)
$\quad d_8=0.40$
$r_9=\infty$
$\quad d_9=0.30$ $nd_5=1.524$ $vd_5=54.5$
$r_{10}=\infty$
$\quad d_{10}=1.278$
$r_{11}=\infty$ (image plane)
Constant of the cone (K) and aspherical surface coefficient ($A_3, A_4, A_5, A_6, A_7, A_8, A_9, A_{10}, A_{12}, A_{13}, A_{14}, A_{15}, A_{16}$)
(second surface)
K=−0.03512,
$A_3=0$, $A_4=5.707\times10^{-3}$,
$A_5=0$, $A_6=-1.576\times10^{-2}$,
$A_7=0$, $A_8=4.023\times10^{-2}$,
$A_9=0$, $A_{10}=-3.229\times10^{-2}$,
$A_{11}=0$, $A_{12}=-1.978\times10^{-2}$,
$A_{13}=0$, $A_{14}=4.407\times10^{-2}$,
$A_{15}=0$, $A_{16}=-1.788\times10^{-2}$
(fourth surface)
K=−1.98846,
$A_3=0$, $A_4=6.143\times10^{-3}$,
$A_5=0$, $A_6=-3.557\times10^{-2}$,
$A_7=0$, $A_8=7.126\times10^{-2}$,
$A_9=0$, $A_{10}=-6.162\times10^{-2}$,
$A_{11}=0$, $A_{12}=-2.354\times10^{-2}$,
$A_{13}=0$, $A_{14}=5.690\times10^{-2}$,
$A_{15}=0$, $A_{16}=-2.183\times10^{-2}$
(fifth surface)
K=0,
$A_3=0$, $A_4=-1.325\times10^{-1}$,
$A_5=0$, $A_6=7.923\times10^{-2}$,
$A_7=0$, $A_8=-7.465\times10^{-2}$,
$A_9=0$, $A_{10}=4.804\times10^{-2}$,
$A_{11}=0$, $A_{12}=-5.208\times10^{-3}$,
$A_{13}=0$, $A_{14}=-1.306\times10^{-2}$,
$A_{15}=0$, $A_{16}=3.092\times10^{-3}$
(sixth surface)
K=0,
$A_3=0$, $A_4=-1.557\times10^{-1}$,
$A_5=0$, $A_6=1.178\times10^{-1}$,
$A_7=0$, $A_8=-5.780\times10^{-2}$,
$A_9=0$, $A_{10}=1.948\times10^{-2}$,
$A_{11}=0$, $A_{12}=2.511\times10^{-3}$,
$A_{13}=0$, $A_{14}=-2.547\times10^{-3}$,
$A_{15}=0$, $A_{16}=3.969\times10^{-4}$
(seventh surface)
K=−1.21976,
$A_3=0$, $A_4=-1.407\times10^{-1}$,
$A_5=0$, $A_6=3.988\times10^{-2}$,
$A_7=0$, $A_8=-6.326\times10^{-3}$,
$A_9=0$, $A_{10}=1.962\times10^{-4}$,
$A_{11}=0$, $A_{12}=6.793\times10^{-5}$,
$A_{13}=0$, $A_{14}=-3.047\times10^{-6}$, $A_{15}=0$, $A_{16}=-3.789\times10^{-7}$
(eighth surface)
K=−5.38629,
$A_3=0$, $A_4=-5.964\times10^{-2}$,
$A_5=0$, $A_6=1.300\times10^{-2}$,
$A_7=0$, $A_8=-1.973\times10^{-3}$,
$A_9=0$, $A_{10}=1.070\times10^{-4}$,
$A_{11}=0$, $A_{12}=1.155\times10^{-5}$,
$A_{13}=0$, $A_{14}=-2.297\times10^{-6}$,
$A_{15}=0$, $A_{16}=1.074\times10^{-7}$ FIG. 2 is a spherical aberration diagram of the image lens according to the first embodiment. FIG. 3 is an astigmatism diagram in d-line (λ=587.56 nm) and a distortion diagram of the imaging lens according to the first embodiment. In the astigmatism diagram, S is the sagittal image surface; M is the meridional image surface.

Figure 4:
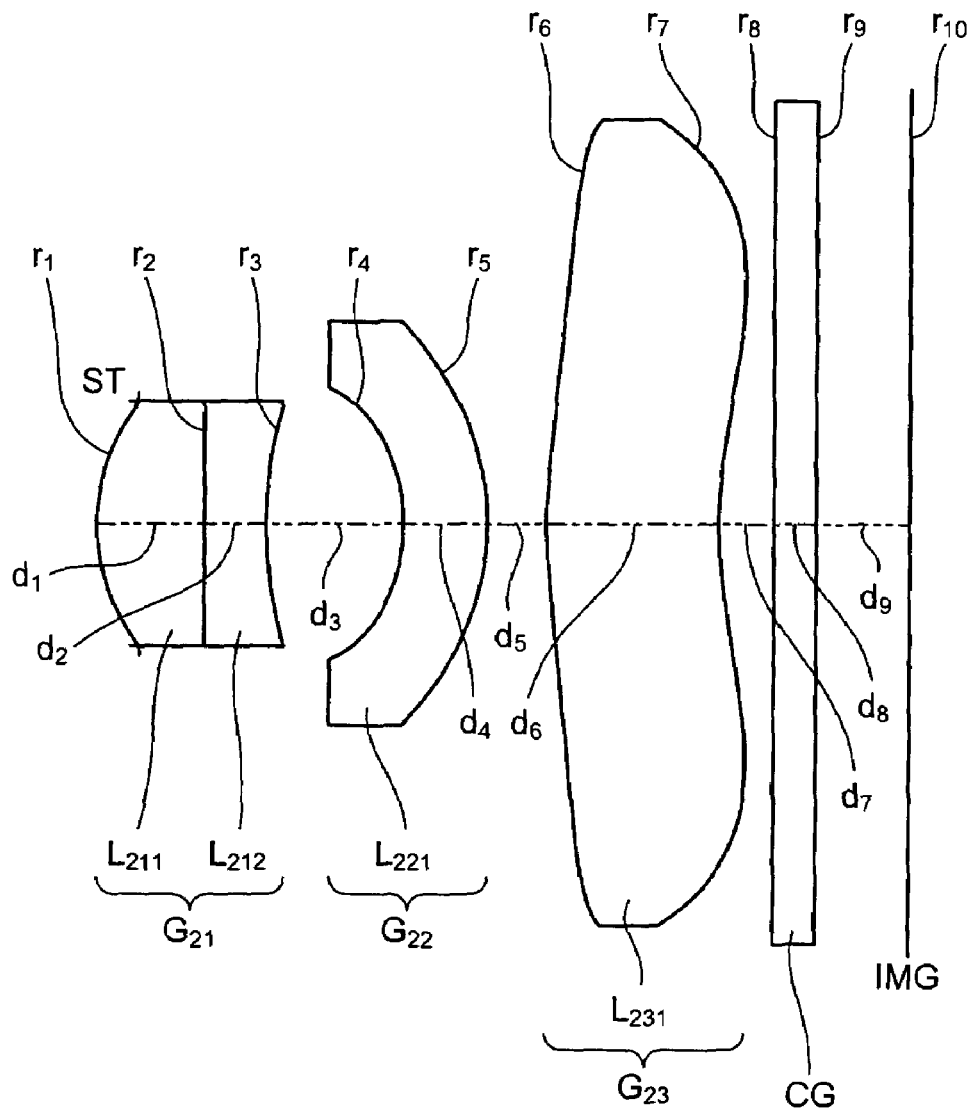
FIG. 4 is a cross-sectional view along the optical axis of an imaging lens according to a second embodiment.

FIG. 4 is a cross-sectional view along the optical axis of an imaging lens according to a second embodiment. The imaging lens includes sequentially from an object side which is not illustrated, a first lens group $G_{21}$, a second lens group $G_{22}$, and a third lens group $G_{23}$. Further, an aperture ST of a given diameter is provided near an object-side surface of the first lens group $G_{21}$. A cover glass CG formed by a parallel plate is arranged between the third lens group $G_{23}$ and an image plane IMG. Further, an optical receiving surface of an imaging element such as a CCD or a CMOS is arranged on the image plane IMG.

The first lens group $G_{21}$ includes sequentially from the object side, a first lens $L_{211}$ formed of resin and having a positive refractive power and a second lens $L_{212}$ formed of resin and having a negative refractive power, collectively forming a cemented lens having a positive refractive power.

The second lens group $G_{22}$ includes a negative meniscus lens $L_{221}$ whose convex surface is directed toward the image plane IMG. Further, the lens $L_{221}$ is preferably formed of resin.

The third lens group $G_{23}$ includes a positive meniscus lens $L_{231}$, whose convex surface is directed toward the object side. Further, the lens $L_{231}$ is preferably formed of resin.

The object-side surface of the first lens $L_{211}$, the image-plane-IMG-side surface of the second lens $L_{212}$, both surfaces of the lens $L_{221}$, and both surfaces of the lens $L_{231}$ are aspherical.

Values concerning the imaging lens according to second embodiment are given below.
The focal length of the imaging lens (f)=4.78
The F number=2.80
The diameter of the effective image circle of the imaging lens (2Y)=6.00
The focal length of the first lens group $G_{21}$ ($f_1$)=3.982
The focal length of the first lens $L_{211}$ of the first lens group $G_{21}$ ($f_{11}$)=2.707
The focal length of the second lens $L_{212}$ of the first lens group $G_{21}$ ($f_{12}$)=−6.277
The refractive index of d-line of the first lens $L_{211}$ of the first lens group $G_{21}$ ($n_1$)=1.531
The refractive index of d-line of the second lens $L_{212}$ of the first lens group $G_{21}$ ($n_2$)=1.586
(Values concerning conditional expression 1)

$$f_1/f=0.833$$

(Values concerning conditional expression 2)

$$|f_{11}/f_{12}|=0.431$$

(Values concerning conditional expression 3)

$$n_2-n_1=0.055$$

(Values concerning conditional expression 4)

$$OP/2Y=0.88$$

Figure 5:
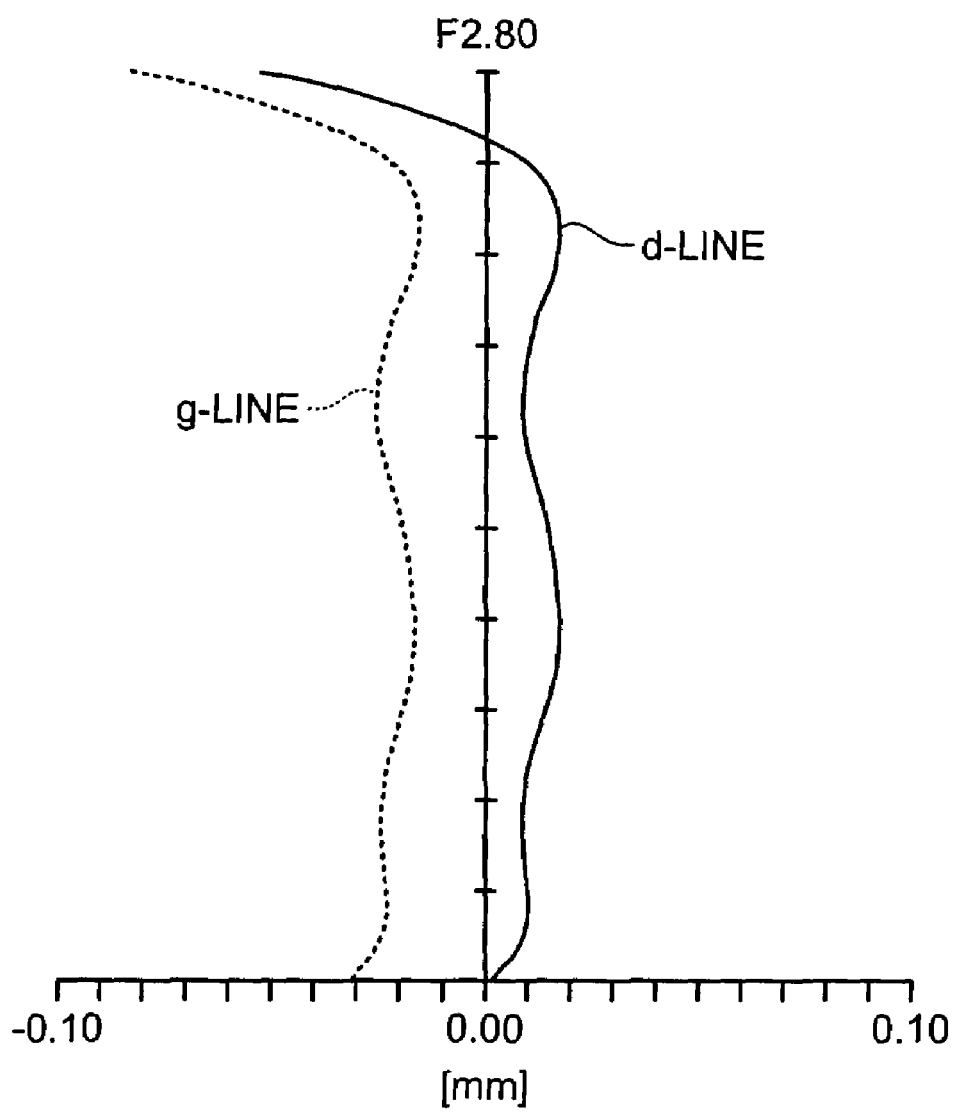
FIG. 5 is a spherical aberration diagram of the image lens according to the second embodiment.
Figure 6:
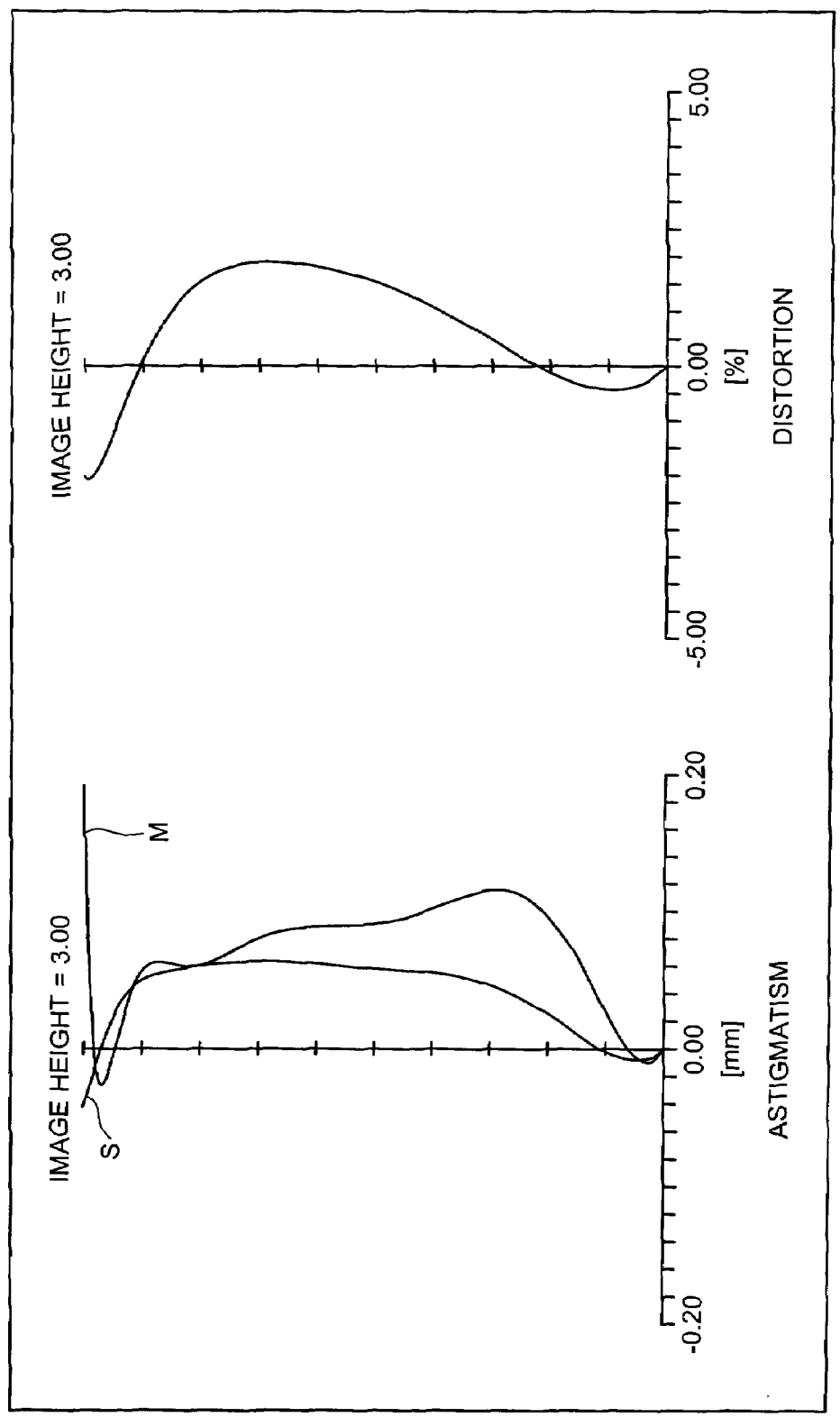
FIG. 6 is an astigmatism diagram in d-line ($\lambda$=587.56 nm) and a distortion diagram of the imaging lens according to the second embodiment.

$r_1$=1.45129 (aspherical surface)
    $d_1$=0.700 $nd_1$=1.531 $vd_1$=56.0
$r_2$=−129.12716
    $d_2$=0.40 $nd_2$=1.586 $vd_2$=29.9
$r_3$=3.78684 (aspherical surface)
    $d_3$=0.902
$r_4$=−1.65506 (aspherical surface)
    $d_4$=0.547 $nd_3$=1.586 $vd_3$=29.9
$r_5$=−3.10199 (aspherical surface)
    $d_5$=0.394
$r_6$=2.36455 (aspherical surface)
    $d_6$=1.125 $nd_4$=1.525 $vd_4$=56.2
$r_7$=2.632 (aspherical surface)
    $d_7$=0.35
$r_8$=∞
    $d_8$=0.30 $nd_5$=1.518 $vd_5$=59.0
$r_9$=∞
    $d_9$=0.587
$r_{10}$=∞ (image plane)
Constant of the cone (K) and Aspherical surface coefficient ($A_3$, $A_4$, $A_5$, $A_6$, $A_7$, $A_8$, $A_9$, $A_{10}$, $A_{11}$, $A_{12}$, $A_{13}$, $A_{14}$, $A_{15}$, $A_{16}$)
(first surface)
K=−3.08725,
$A_3=3.518\times10^{-3}$, $A_4=2.082\times10^{-1}$,
$A_5=-5.238\times10^{-1}$, $A_6=1.418$,
$A_7=-2.032$, $A_8=1.495$,
$A_9=-5.074\times10^{-1}$, $A_{10}=6.746\times10^{-2}$
$A_{11}=0$, $A_{12}=0$,
$A_{13}=0$, $A_{14}=0$,
$A_{15}=0$, $A_{16}=0$
(third surface)
K=15.11916,
$A_3=6.041\times10^{-2}$, $A_4=-2.207\times10^{-1}$,
$A_5=5.133\times10^{-1}$, $A_6=-8.556\times10^{-1}$,
$A_7=8.741\times10^{-1}$, $A_8=-4.108\times10^{-1}$,
$A_9=4.996\times10^{-5}$, $A_{10}=-6.062\times10^{-4}$
$A_{11}=0$, $A_{12}=0$,
$A_{13}=0$, $A_{14}=0$,
$A_{15}=0$, $A_{16}=0$
(fourth surface)
K=1.98247,
$A_3=1.429\times10^{-2}$, $A_4=-3.072\times10^{-1}$,
$A_5=6.895\times10^{-1}$, $A_6=-6.342\times10^{-1}$,
$A_7=4.543\times10^{-2}$, $A_8=2.279\times10^{-1}$,
$A_9=-2.232\times10^{-2}$, $A_{10}=-3.080\times10^{-2}$
$A_{11}=0$, $A_{12}=0$,
$A_{13}=0$, $A_{14}=0$,
$A_{15}=0$, $A_{16}=0$
(fifth surface)
K=−0.76550,
$A_3=-1.370\times10^{-1}$, $A_4=2.986\times10^{-2}$,
$A_5=-7.069\times10^{-2}$, $A_6=1.170\times10^{-1}$,
$A_7=-5.009\times10^{-2}$, $A_8=-3.744\times10^{-2}$,
$A_9=5.620\times10^{-2}$, $A_{10}=-1.860\times10^{-2}$
$A_{11}=0$, $A_{12}=0$,
$A_{13}=0$, $A_{14}=0$,
$A_{15}=0$, $A_{16}=0$
(sixth surface)
K=−0.75438,
$A_3=-1.072\times10^{-1}$, $A_4=-7.419\times10^{-2}$,
$A_5=5.708\times10^{-2}$, $A_6=1.344\times10^{-3}$,
$A_7=-3.754\times10^{-3}$, $A_8=-9.456\times10^{-4}$,
$A_9=1.183\times10^{-4}$, $A_{10}=7.990\times10^{-5}$
$A_{11}=0$, $A_{12}=0$, $A_{13}=0$, $A_{14}=0$,
$A_{15}=0$, $A_{16}=0$
(seventh surface)
K=−0.15401,
$A_3=-3.364\times10^{-2}$, $A_4=-6.001\times10^{-2}$,
$A_5=2.268\times10^{-2}$, $A_6=-2.223\times10^{-3}$,
$A_7=-1.741\times10^{-3}$, $A_8=3.876\times10^{-4}$,
$A_9=2.933\times10^{-4}$, $A_{10}=-1.170\times10^{-4}$
$A_{11}=0$, $A_{12}=0$,
$A_{13}=0$, $A_{14}=0$,
$A_{15}=0$, $A_{16}=0$ FIG. 5 is a spherical aberration diagram of the image lens according to the second embodiment. FIG. 6 is an astigmatism diagram in d-line (λ=587.56 nm) and a distortion diagram of the imaging lens according to the second embodiment. In the astigmatism diagram, S is the sagittal image surface; M is the meridional image surface.

Figure 7:
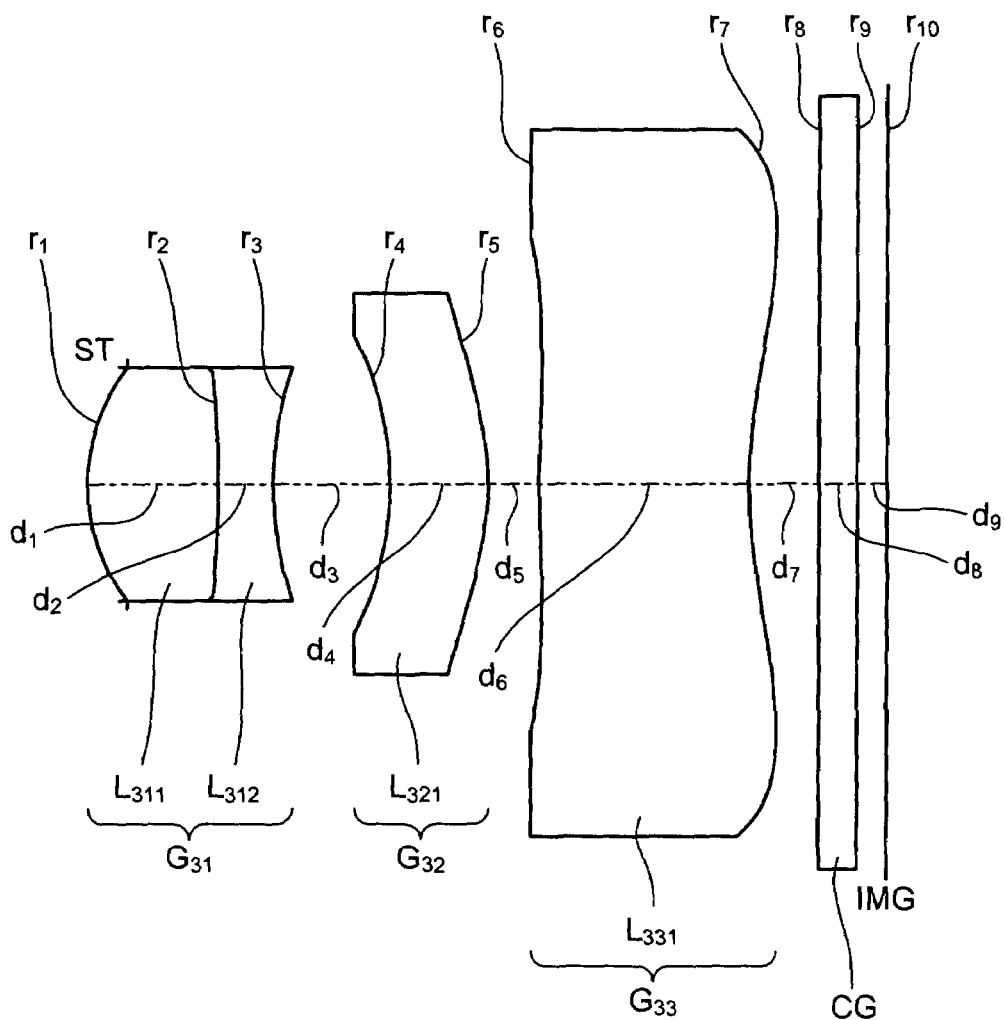
FIG. 7 is a cross-sectional view along the optical axis of an imaging lens according to a third embodiment.

FIG. 7 is a cross-sectional view along the optical axis of an imaging lens according to a third embodiment. The imaging lens includes sequentially from an object side which is not illustrated, a first lens group $G_{31}$, a second lens group $G_{32}$, and a third lens group $G_{33}$. Further, an aperture ST of a given diameter is provided near an object-side surface of the first lens group $G_{31}$. A cover glass CG formed by a parallel plate is arranged between the third lens group $G_{33}$ and an image plane IMG. Further, an optical receiving surface of an imaging element such as a CCD or a CMOS is arranged on the image plane IMG.

The first lens group $G_{31}$ includes sequentially from the object side, a first lens $L_{311}$ formed of resin and having a positive refractive power and a second lens $L_{312}$ formed of resin and having a negative refractive power, collectively forming a cemented lens having a positive refractive power.

The second lens group $G_{32}$ includes a negative meniscus lens $L_{321}$ whose convex surface is directed toward the image plane IMG. Further, the lens $L_{321}$ is preferably formed of resin.

The third lens group $G_{33}$ includes a positive meniscus lens $L_{331}$ whose convex surface is directed toward the object side. Further, the lens $L_{331}$ is preferably formed of resin.

The object-side surface of the first lens $L_{311}$, the image-plane-IMG-side surface of the second lens $L_{312}$, both surfaces of the lens $L_{321}$, and both surfaces of the lens $L_{331}$ are aspherical.

Values concerning the imaging lens according to the third embodiment are given below.
The focal length of the imaging lens (f)=4.98
The F number=2.92
The diameter of the effective image circle of the imaging lens (2Y)=6.00
The focal length of the first lens group $G_{31}$ ($f_1$)=4.344
The focal length of the first lens $L_{311}$ of the first lens group $G_{31}$ ($f_{11}$)=2.691
The focal length of the second lens $L_{312}$ of the first lens group $G_{31}$ ($f_{12}$)=−5.168
The refractive index of d-line of the first lens $L_{311}$ of the first lens group $G_{31}$ ($n_1$)=1.531
The refractive index of d-line of the second lens $L_{312}$ of the first lens group $G_{31}$ ($n_2$)=1.586
(Values concerning conditional expression 1)

$$f_1/f=0.872$$

(Values concerning conditional expression 2)

$$|f_{11}/f_{12}|=0.521$$

(Values concerning conditional expression 3)

$$n_2-n_1=0.055$$

(Values concerning conditional expression 4)

$$OP/2Y=0.95$$

Figure 8:
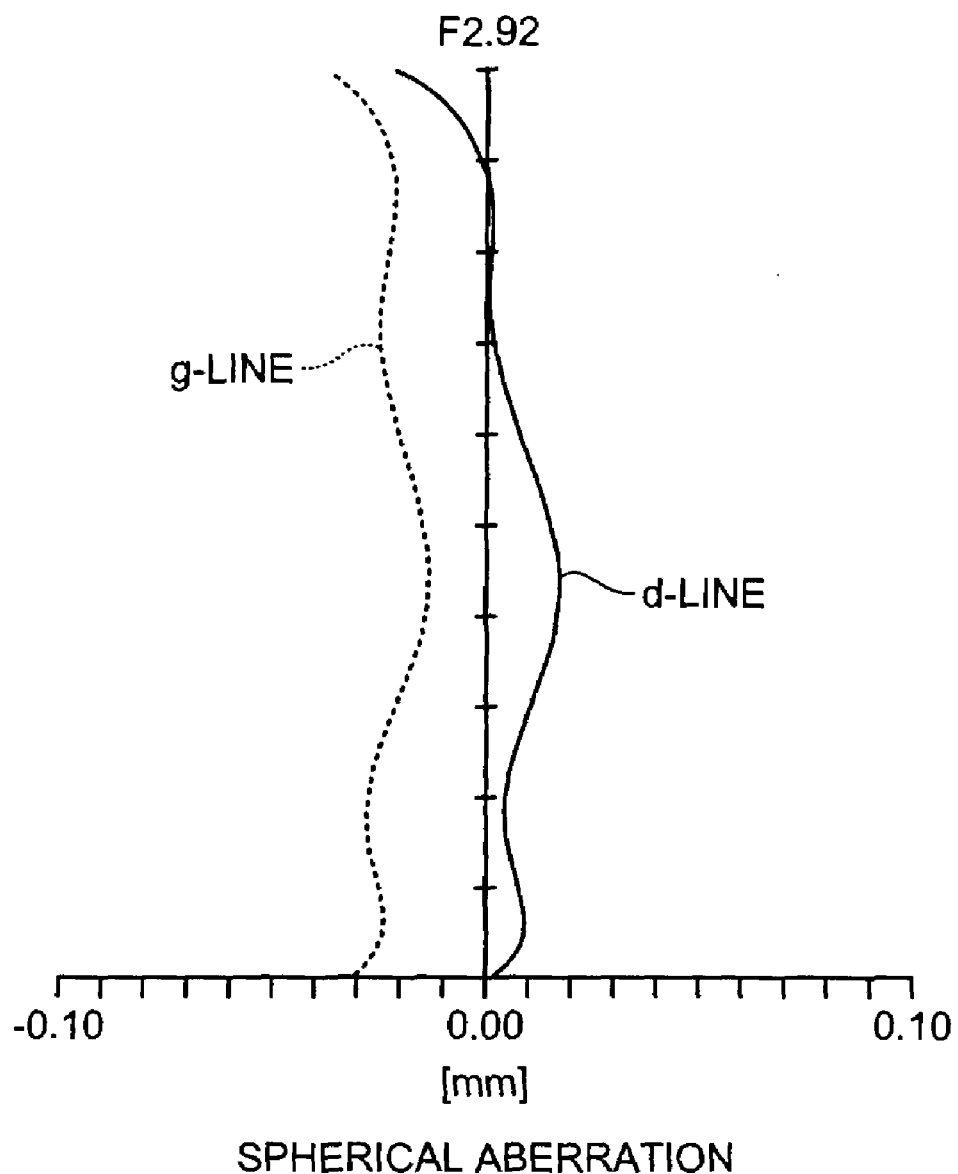
FIG. 8 is a spherical aberration diagram of the image lens according to the third embodiment.
Figure 9:
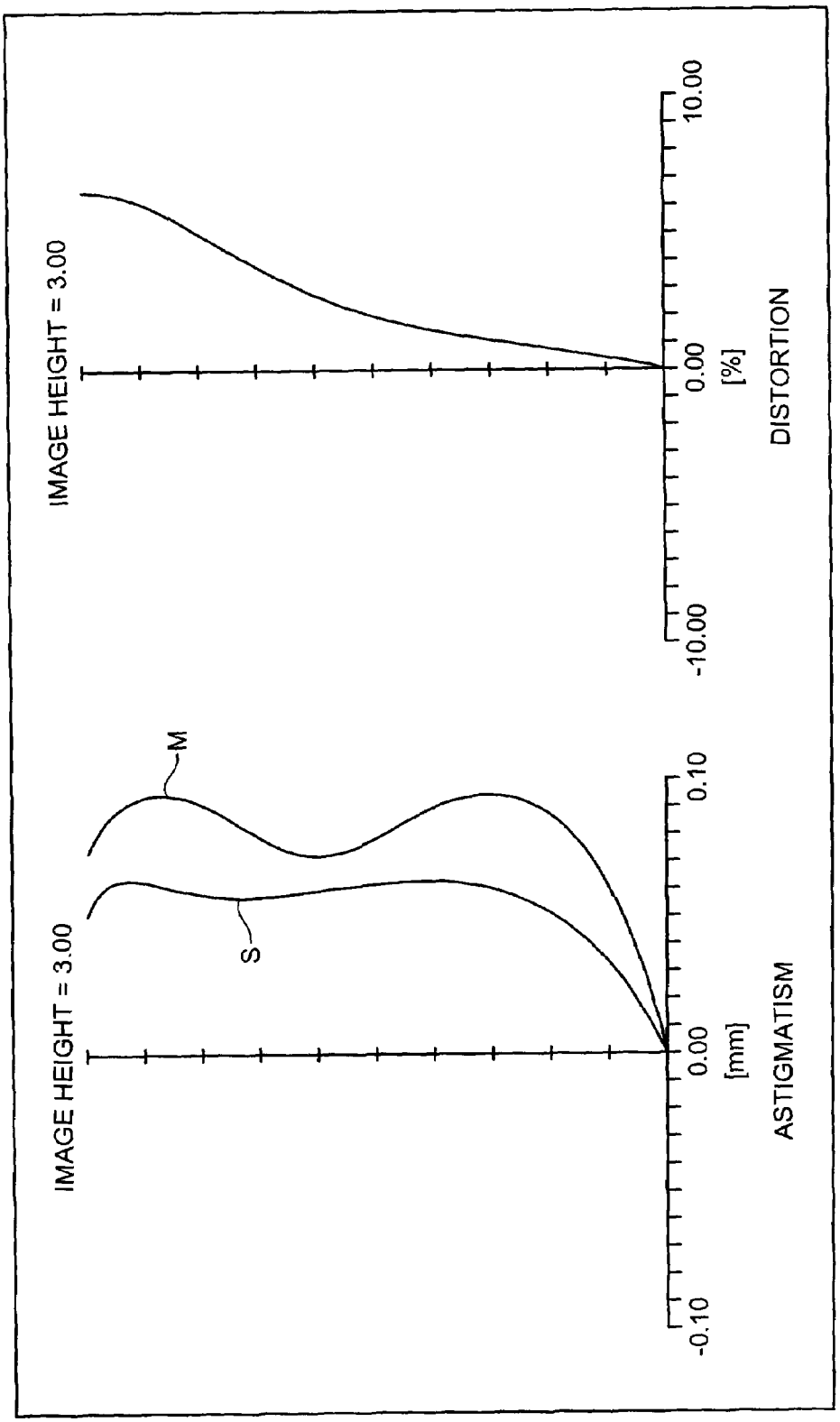
FIG. 9 is an astigmatism diagram in d-line ($\lambda$=587.56 nm) and a distortion diagram of the imaging lens according to the third embodiment.

$r_1$=1.58341 (aspherical surface)
  $d_1$=0.917 $nd_1$=1.531 $vd_1$=56.0
$r_2$=−11.76037
  $d_2$=0.40 $nd_2$=1.586 $vd_2$=29.9
$r_3$=4.125 (aspherical surface)
  $d_3$=0.836
$r_4$=−2.47287 (aspherical surface)
  $d_4$=0.703 $nd_3$=1.613 $vd_3$=26.7
$r_5$=−2.78133 (aspherical surface)
  $d_5$=0.366
$r_6$=9.44476 (aspherical surface)
  $d_6$=1.490 $nd_4$=1.531 $vd_4$=56.0
$r_7$=3.41237 (aspherical surface)
  $d_7$=0.50
$r_8$=∞
  $d_8$=0.30 $nd_5$=1.518 $vd_5$=59.0
$r_9$=∞
  $d_9$=0.205
$r_{10}$=∞ (image plane)
Constant of the cone (K) and Aspherical surface coefficient ($A_3$, $A_4$, $A_5$, $A_6$, $A_7$, $A_8$, $A_9$, $A_{10}$, $A_{11}$, $A_{12}$, $A_{13}$, $A_{14}$, $A_{15}$, $A_{16}$)
(first surface)
K=−4.15452,
$A_3=7.146\times10^{-3}$, $A_4=2.044\times10^{-1}$,
$A_5=-5.316\times10^{-1}$, $A_6=1.420$,
$A_7=-2.027$, $A_8=1.490$,
$A_9=-5.031\times10^{-1}$, $A_{10}=5.658\times10^{-2}$
$A_{11}=0$, $A_{12}=0$,
$A_{13}=0$, $A_{14}=0$,
$A_{15}=0$, $A_{16}=0$
(third surface)
K=13.81959,
$A_3=4.732\times10^{-2}$, $A_4=-1.805\times10^{-1}$,
$A_5=5.334\times10^{-1}$, $A_6=-8.526\times10^{-1}$,
$A_7=8.509\times10^{-1}$, $A_8=-4.228\times10^{-1}$,
$A_9=2.232\times10^{-2}$, $A_{10}=7.478\times10^{-2}$
$A_{11}=0$, $A_{12}=0$,
$A_{13}=0$, $A_{14}=0$,
$A_{15}=0$, $A_{16}=0$
(fourth surface)
K=−0.29440,
$A_3=-8.363\times10^{-4}$, $A_4=3.886\times10^{-3}$,
$A_5=5.679\times10^{-3}$, $A_6=-2.671\times10^{-3}$,
$A_7=-9.484\times10^{-3}$, $A_8=-8.873\times10^{-3}$,
$A_9=-3.336\times10^{-4}$, $A_{10}=1.469\times10^{-2}$
$A_{11}=0$, $A_{12}=0$,
$A_{13}=0$, $A_{14}=0$,
$A_{15}=0$, $A_{16}=0$
(fifth surface)
K=−7.55449,
$A_3=-2.262\times10^{-2}$, $A_4=-1.388\times10^{-3}$,
$A_5=2.063\times10^{-3}$, $A_6=2.306\times10^{-3}$,
$A_7=1.829\times10^{-3}$, $A_8=1.122\times10^{-3}$,
$A_9=8.136\times10^{-4}$, $A_{10}=-6.974\times10^{-4}$
$A_{11}=0$, $A_{12}=0$,
$A_{13}=0$, $A_{14}=0$,
$A_{15}=0$, $A_{16}=0$
(sixth surface)
K=−89.52190,
$A_3=-2.169\times10^{-2}$, $A_4=-9.918\times10^{-3}$,
$A_5=1.090\times10^{-3}$, $A_6=1.902\times10^{-3}$,
$A_7=7.176\times10^{-4}$, $A_8=3.015\times10^{-5}$,
$A_9=-1.254\times10^{-4}$, $A_{10}=-8.045\times10^{-5}$
$A_{11}=0$, $A_{12}=0$, $A_{13}=0, A_{14}=0,$
$A_{15}=0, A_{16}=0$
(seventh surface)
K=−18.21906,
$A_3=1.801\times10^{-2}, A_4=-2.269\times10^{-2},$
$A_5=3.054\times10^{-3}, A_6=2.179\times10^{-4},$
$A_7=2.059\times10^{-5}, A_8=2.019\times10^{-5},$
$A_9=7.572\times10^{-6}, A_{10}=-1.810\times10^{-5}$
$A_{11}=0, A_{12}=0,$
$A_{13}=0, A_{14}=0,$
$A_{15}=0, A_{16}=0$ FIG. 8 is a spherical aberration diagram of the image lens according to the third embodiment. FIG. 9 is an astigmatism diagram in d-line (λ=587.56 nm) and a distortion diagram of the imaging lens according to the third embodiment. In the astigmatism diagram, S is the sagittal image surface; M is the meridional image surface.

Figure 10:
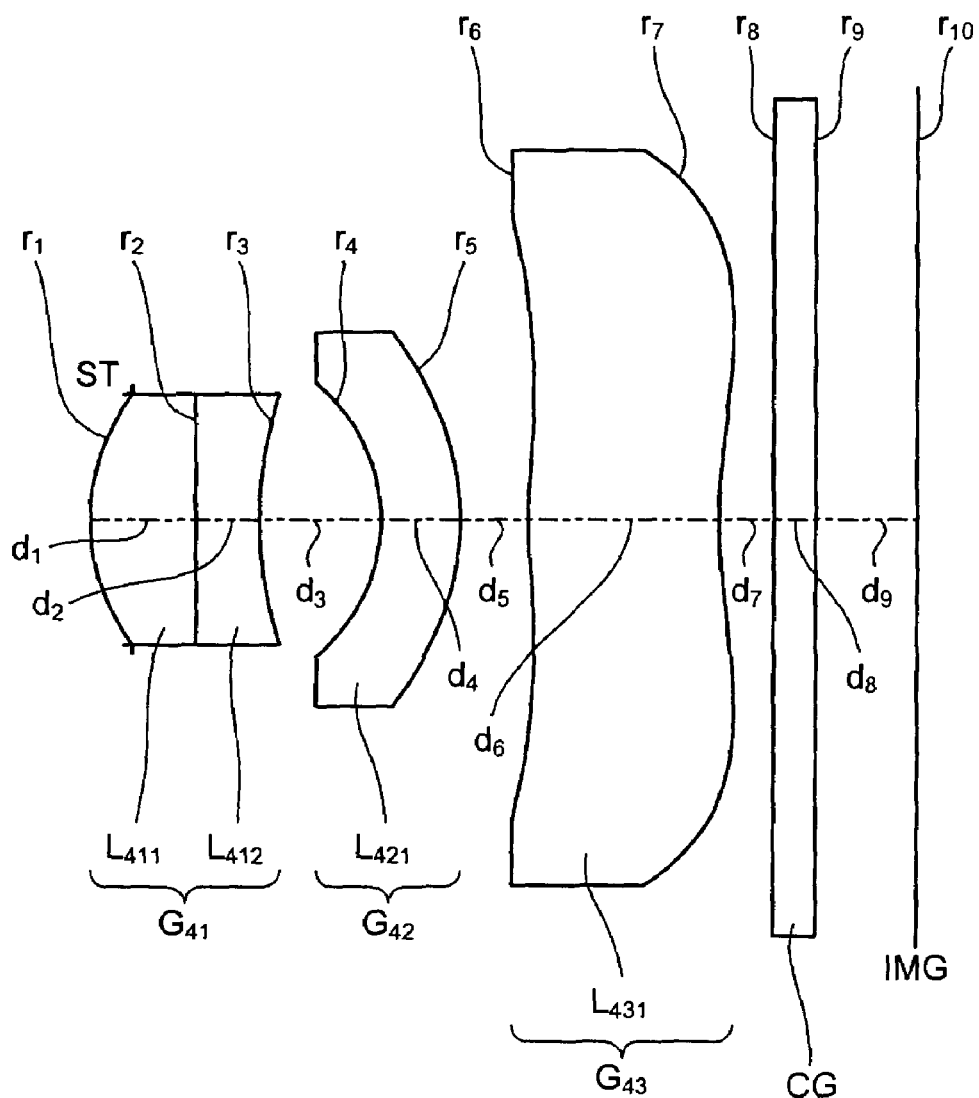
FIG. 10 is a cross-sectional view along the optical axis of an imaging lens according to a fourth embodiment.

FIG. 10 is a cross-sectional view along the optical axis of an imaging lens according to a fourth embodiment. The imaging lens includes sequentially from an object side which is not illustrated, a first lens group $G_{41}$, a second lens group $G_{42}$, and a third lens group $G_{43}$. Further, an aperture ST of a given diameter is provided near an object-side surface of the first lens group $G_{41}$. A cover glass CG formed by a parallel plate is arranged between the third lens group $G_{43}$ and an image plane IMG. Further, an optical receiving surface of an imaging element such as a CCD or a CMOS is arranged on the image plane IMG.

The first lens group $G_{41}$ includes sequentially from the object side, a first lens $L_{411}$ formed of resin and having a positive refractive power and a second lens $L_{412}$ formed of resin and having a negative refractive power, collectively forming a cemented lens having a positive refractive power.

The second lens group $G_{42}$ includes a negative meniscus lens $L_{421}$ whose convex surface is directed toward the image plane IMG. Further, the lens $L_{421}$ is preferably formed of resin.

The third lens group $G_{43}$ includes a positive meniscus lens $L_{431}$ whose convex surface is directed toward the object side. Further, the lens $L_{431}$ is preferably formed of resin.

The object-side surface of the first lens $L_{411}$, the image-plane-IMG-side surface of the second lens $L_{412}$, both surfaces of the lens $L_{421}$, and both surfaces of the lens $L_{431}$ are aspherical.

Values concerning the imaging lens according to fourth embodiment are given below.
The focal length of the imaging lens (f)=4.81
The F number=2.82
The diameter of the effective image circle of the imaging lens (2Y)=6.00
The focal length of the first lens group $G_{41}$ ($f_1$)=3.914
The focal length of the first lens $L_{411}$ of the first lens group $G_{41}$ ($f_{11}$)=2.664
The focal length of the second lens $L_{412}$ of the first lens group $G_{41}$ ($f_{12}$)=−6.197
The refractive index of d-line of the first lens $L_{411}$ of the first lens group $G_{41}$ ($n_1$)=1.531
The refractive index of d-line of the second lens $L_{412}$ of the first lens group $G_{41}$ ($n_2$)=1.586
(Values concerning conditional expression 1)

$$f_1/f=0.814$$

(Values concerning conditional expression 2)

$$|f_{11}/f_{12}|=0.430$$

(Values concerning conditional expression 3)

$$n_2-n_1=0.055$$

(Values concerning conditional expression 4)

$$OP/2Y=0.89$$

Figure 11:
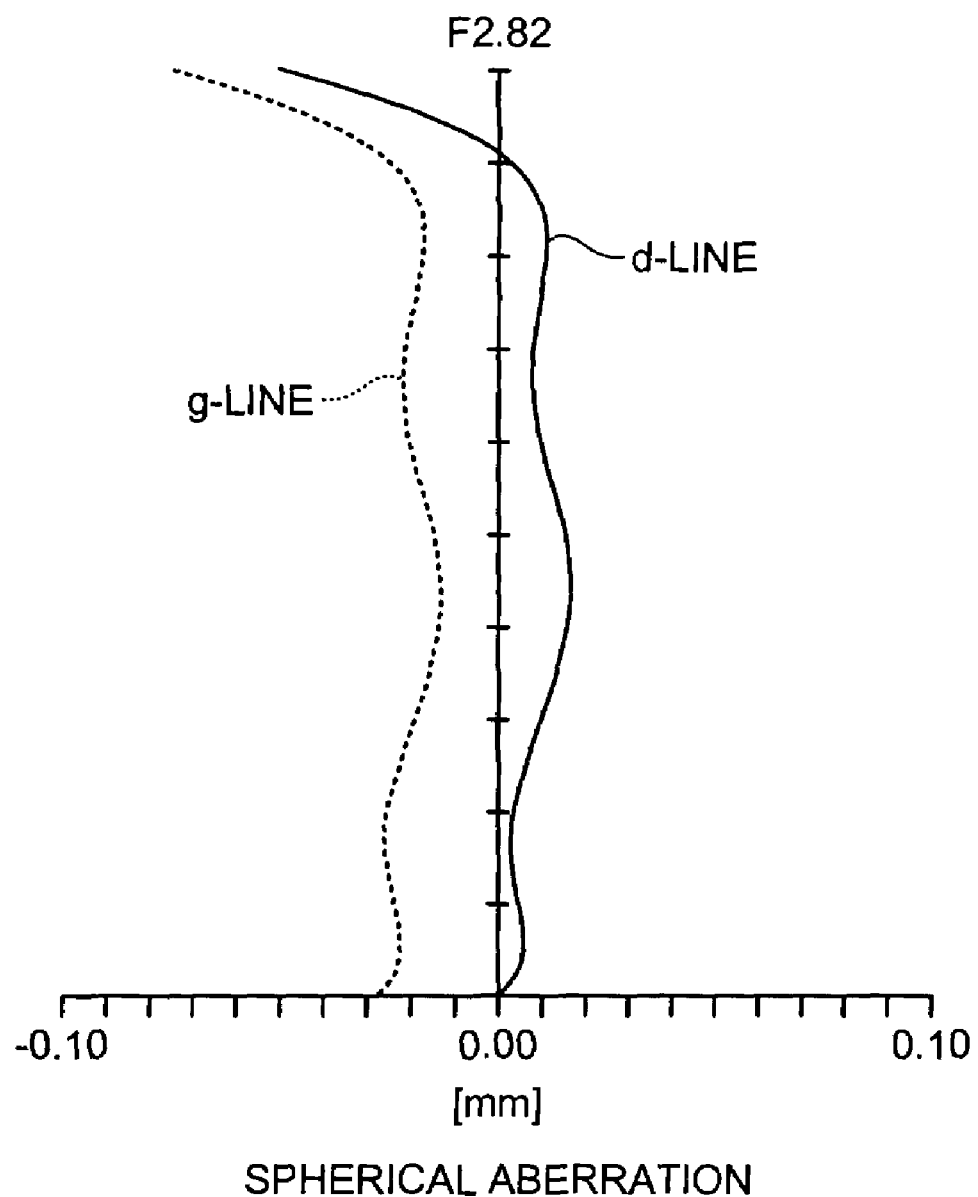
FIG. 11 is a spherical aberration diagram of the image lens according to the fourth embodiment.
Figure 12:
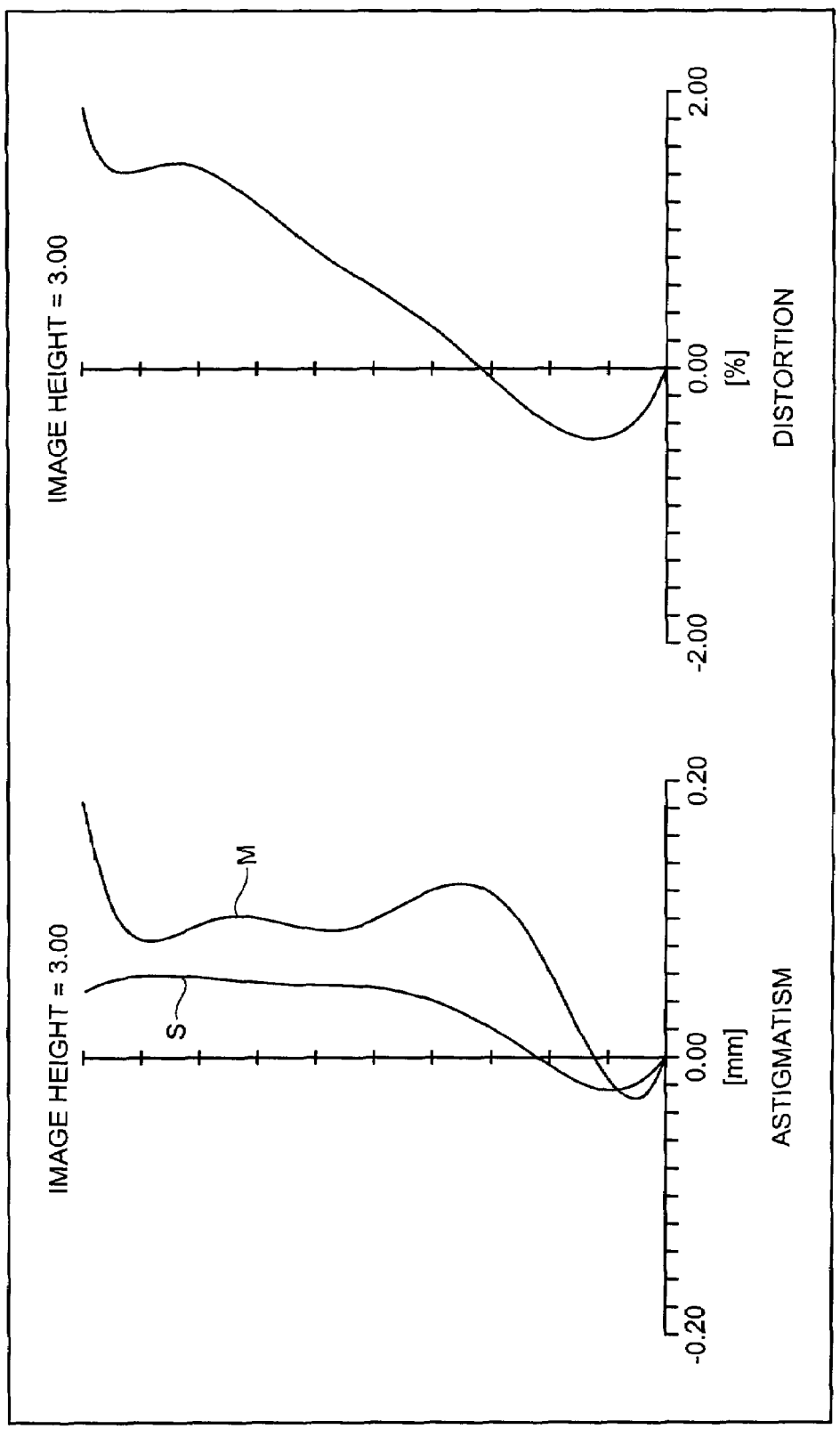
FIG. 12 is an astigmatism diagram in d-line ($\lambda$=587.56 nm) and a distortion diagram of the imaging lens according to the fourth embodiment.

$r_1$=1.43197 (aspherical surface)
  $d_1$=0.685 $nd_1$=1.531 $vd_1$=56.0
$r_2$=−100
  $d_2$=0.40 $nd_2$=1.586 $vd_2$=29.9
$r_3$=3.77016 (aspherical surface)
  $d_3$=0.783
$r_4$=−1.68016 (aspherical surface)
  $d_4$=0.527 $nd_3$=1.614 $vd_3$=26.0
$r_5$=−2.61490 (aspherical surface)
  $d_5$=0.439
$r_6$=3.38180 (aspherical surface)
  $d_6$=1.209 $nd_4$=1.525 $vd_4$=56.2
$r_7$=3.13425 (aspherical surface)
  $d_7$=0.35
$r_8$=∞
  $d_8$=0.30 $nd_5$=1.518 $vd_5$=59.0
$r_9$=∞
  $d_9$=0.629
$r_{10}$=∞ (image plane)
Constant of the cone (K) and Aspherical surface coefficient ($A_3, A_4, A_5, A_6, A_7, A_8, A_9, A_{10}, A_{11}, A_{12}, A_{13}, A_{14}, A_{15}, A_{16}$)
(first surface)
K=−3.03926,
$A_3=3.770\times10^{-3}, A_4=2.110\times10^{-1},$
$A_5=-5.215\times10^{-1}, A_6=1.420,$
$A_7=-2.031, A_8=1.496,$
$A_9=-5.070\times10^{-1}, A_{10}=-6.780\times10^{-2}$
$A_{11}=0, A_{12}=0,$
$A_{13}=0, A_{14}=0,$
$A_{15}=0, A_{16}=0$
(third surface)
K=15.92033,
$A_3=6.720\times10^{-2}, A_4=-2.229\times10^{-1},$
$A_5=5.130\times10^{-1}, A_6=-8.541\times10^{-1},$
$A_7=8.759\times10^{-1}, A_8=-4.090\times10^{-1},$
$A_9=2.512\times10^{-3}, A_{10}=4.776\times10^{-3}$
$A_{11}=0, A_{12}=0,$
$A_{13}=0, A_{14}=0,$
$A_{15}=0, A_{16}=0$
(fourth surface)
K=−1.98759,
$A_3=7.700\times10^{-3}, A_4=-2.905\times10^{-1},$
$A_5=6.869\times10^{-1}, A_6=-6.389\times10^{-1},$
$A_7=4.829\times10^{-2}, A_8=2.372\times10^{-1},$
$A_9=-1.428\times10^{-2}, A_{10}=-3.500\times10^{-2}$
$A_{11}=0, A_{12}=0,$
$A_{13}=0, A_{14}=0,$
$A_{15}=0, A_{16}=0$
(fifth surface)
K=−0.73390,
$A_3=-1.167\times10^{-1}, A_4=2.322\times10^{-2},$
$A_5=-7.073\times10^{-2}, A_6=1.177\times10^{-1},$
$A_7=-4.971\times10^{-2}, A_8=-3.715\times10^{-2},$
$A_9=5.698\times10^{-2}, A_{10}=-1.732\times10^{-2}$
$A_{11}=0, A_{12}=0,$
$A_{13}=0, A_{14}=0,$
$A_{15}=0, A_{16}=0$
(sixth surface)
K=−29.74450,
$A_3=-2.831\times10^{-2}, A_4=-9.452\times10^{-2},$
$A_5=5.242\times10^{-2}, A_6=8.713\times10^{-3},$
$A_7=-4.049\times10^{-3}, A_8=-3.037\times10^{-3},$
$A_9=1.716\times10^{-4}, A_{10}=3.107\times10^{-4}$
$A_{11}=0, A_{12}=0,$ $A_{13}=0, A_{14}=0,$
$A_{15}=0, A_{16}=0$
(seventh surface)
$K=-26.75000,$
$A_3=3.918\times10^{-2}, A_4=-5.862\times10^{-2},$
$A_5=-7.185\times10^{-4}, A_6=1.100\times10^{-2},$
$A_7=-1.442\times10^{-3}, A_8=-9.478\times10^{-4},$
$A_9=1.189\times10^{-4}, A_{10}=1.190\times10^{-5}$
$A_{11}=0, A_{12}=0,$
$A_{13}=0, A_{14}=0,$
$A_{15}=0, A_{16}=0$ FIG. 11 is a spherical aberration diagram of the image lens according to the fourth embodiment. FIG. 12 is an astigmatism diagram in d-line ($\lambda$=587.56 nm) and a distortion diagram of the imaging lens according to the fourth embodiment. In the astigmatism diagram, S is the sagittal image surface; M is the meridional image surface.

Figure 13:
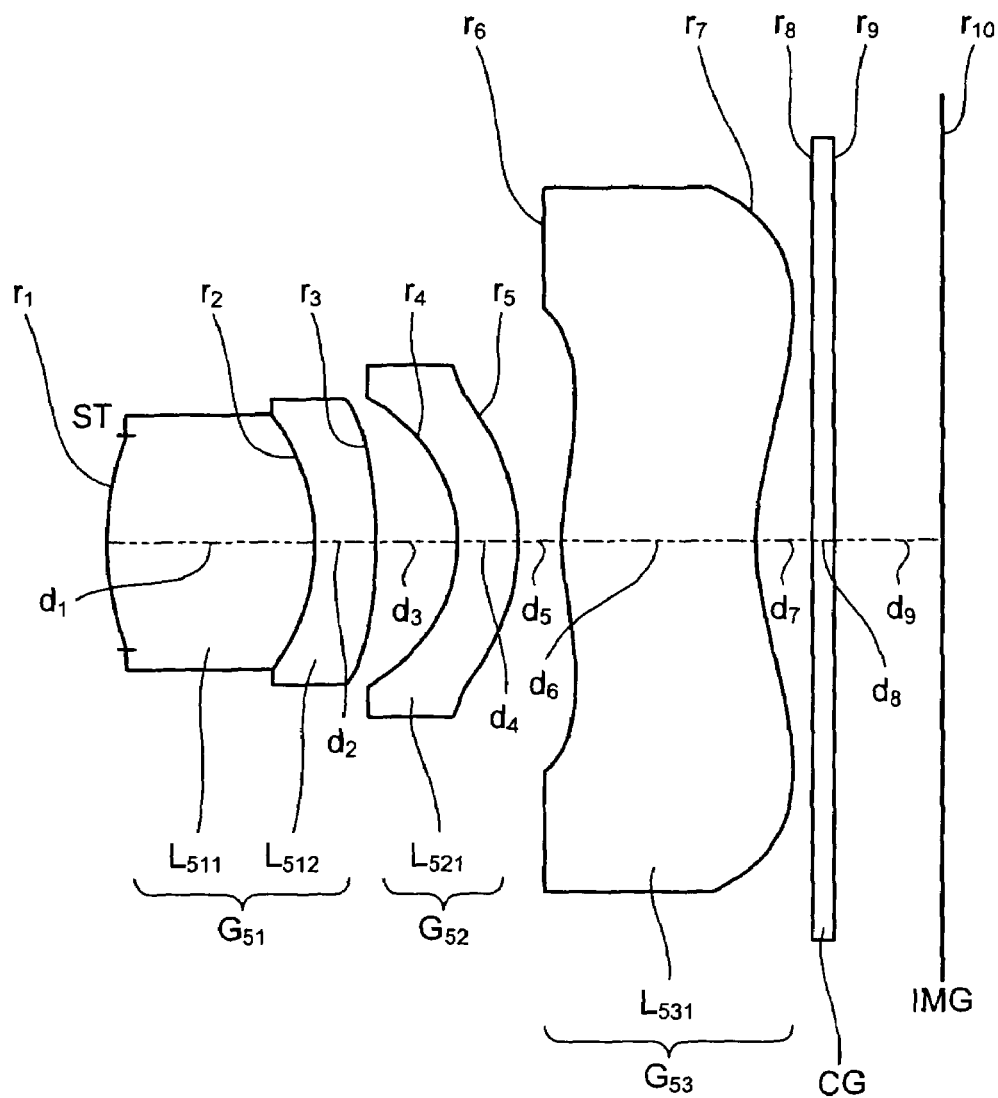
FIG. 13 is a cross-sectional view along the optical axis of an imaging lens according to a fifth embodiment.

FIG. 13 is a cross-sectional view along the optical axis of an imaging lens according to a fifth embodiment. The imaging lens includes sequentially from an object side which is not illustrated, a first lens group $G_{51}$, a second lens group $G_{52}$, and a third lens group $G_{53}$. Further, an aperture ST of a given diameter is provided in near an object-side surface of the first lens group $G_{51}$. A cover glass CG formed by a parallel plate is arranged between the third lens group $G_{53}$ and an image plane IMG. Further, an optical receiving surface of an imaging element such as a CCD or a CMOS is arranged on the image plane IMG.

The first lens group $G_{51}$ includes sequentially from the object side, a first lens $L_{511}$ formed of resin and having a positive refractive power and a second lens $L_{512}$ formed of resin and having a negative refractive power, collectively forming a cemented lens having a positive refractive power.

The second lens group $G_{52}$ includes a negative meniscus lens $L_{521}$ whose convex surface is directed toward the image plane IMG. Further, the lens $L_{521}$ is preferably formed of resin.

The third lens group $G_{53}$ includes a positive meniscus lens $L_{531}$ whose convex surface is directed toward the object side. Further, the lens $L_{531}$ is preferably formed of resin.

The object-side surface of the first lens $L_{511}$, the image-plane-IMG-side surface of the second lens $L_{512}$, both surfaces of the lens $L_{521}$, and both surfaces of the lens $L_{531}$ are aspherical.

Values concerning the imaging lens according to the fifth embodiment are given below.
The focal length of the imaging lens (f)=5.54
The F number=2.98
The diameter of the effective image circle of the imaging lens (2Y)=7.76
The focal length of the first lens group $G_{51}$ ($f_1$)=4.148
The focal length of the first lens $L_{511}$ of the first lens group $G_{51}$ ($f_{11}$)=2.468
The focal length of the second lens $L_{512}$ of the first lens group G51 ($f_{12}$)=-5.119
The refractive index of d-line of the first lens $L_{511}$ of the first lens group $G_{51}$ ($n_1$)=1.525
The refractive index of d-line of the second lens $L_{512}$ Of the first lens group $G_{51}$ ($n_2$)=1.586

(Values concerning conditional expression 1)

$f_1/f=0.749$ (Values concerning conditional expression 2)

$|f_{11}/f_{12}|=0.482$ (Values concerning conditional expression 3)

$n_2-n_1=0.061$ (Values concerning conditional expression 4)

Figure 14:
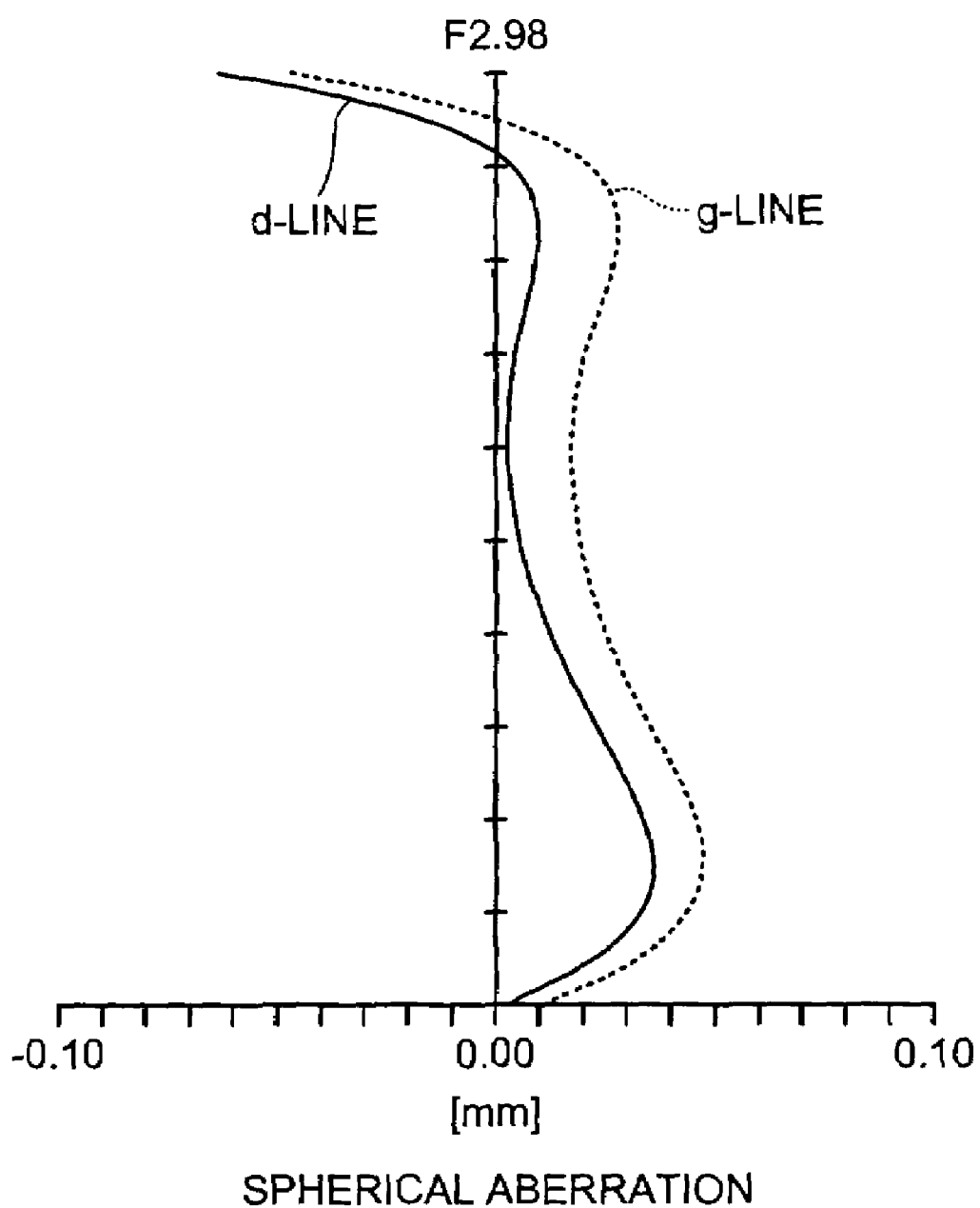
FIG. 14 is a spherical aberration diagram of the image lens according to the fifth embodiment.
Figure 15:
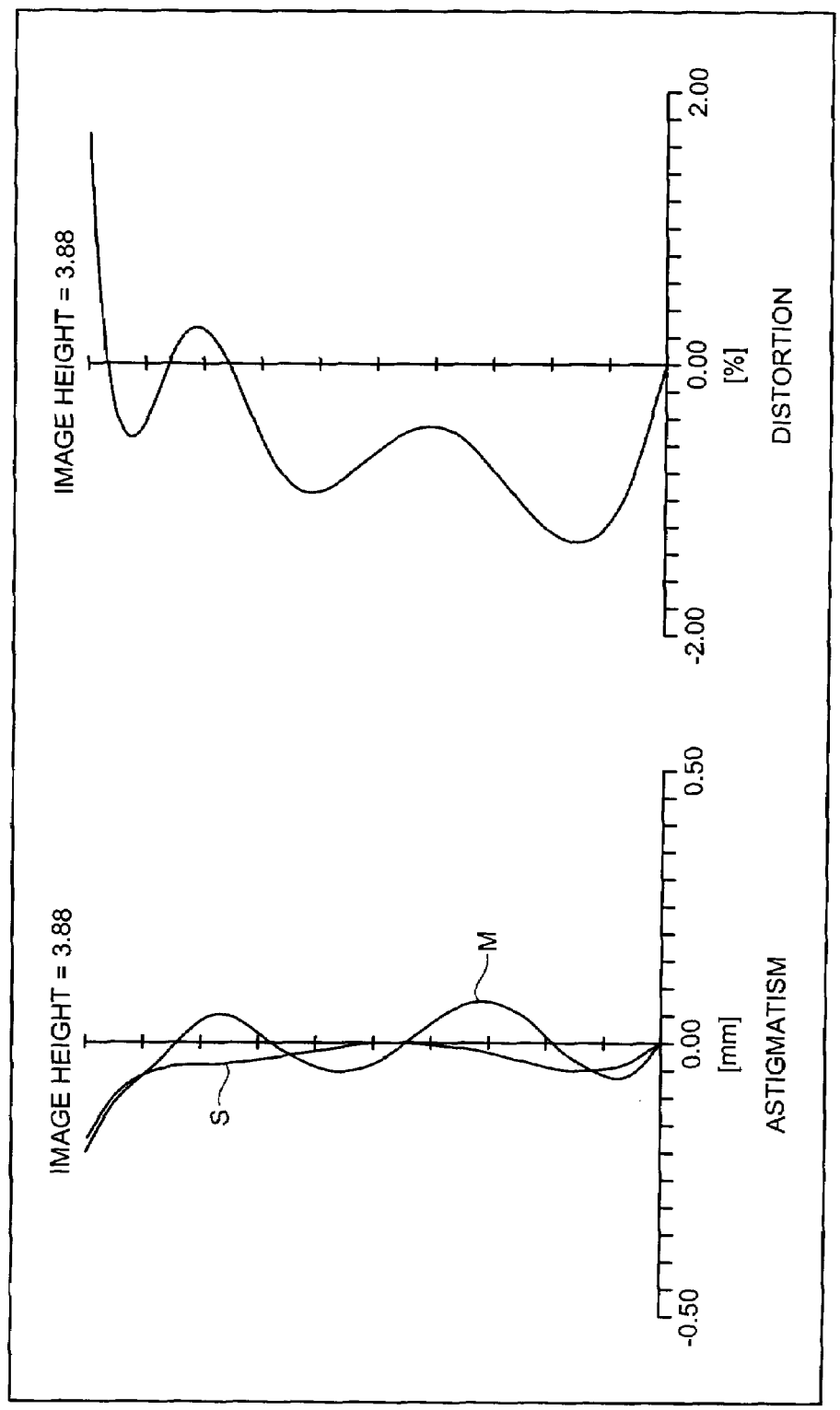
FIG. 15 is an astigmatism diagram in d-line ($\lambda$=587.56 nm) and a distortion diagram of the imaging lens according to the fifth embodiment.

$OP/2Y=0.89$ $r_1=2.67472$ (aspherical surface)
 $d_1=1.726$ $nd_1=1.525$ $vd_1=56.2$
$r_2=-1.95241$
 $d_2=0.50$ $nd_2=1.586$ $vd_2=29.9$
$r_3=-6.13108$ (aspherical surface)
 $d_3=0.680$
$r_4=-1.19695$ (aspherical surface)
 $d_4=0.500$ $nd_3=1.586$ $vd_3=29.9$
$r_5=-1.85871$ (aspherical surface)
 $d_5=0.358$
$r_6=2.94676$ (aspherical surface)
 $d_6=1.602$ $nd_4=1.525$ $vd_4=56.2$
$r_7=2.39554$ (aspherical surface)
 $d_7=0.49$
$r_8=\infty$
 $d_8=0.16$ $nd_5=1.517$ $vd_5=64.2$
$r_9=\infty$
 $d_9=0.884$
$r_{10}=\infty$ (image plane)
Constant of the cone (K) and Aspherical surface coefficient ($A_3, A_4, A_5, A_6, A_7, A_8, A_9, A_{10}, A_{11}, A_{12}, A_{13}, A_{14}, A_{15}, A_{16}$)
(first surface)
$K=3.14216,$
$A_3=-1.2089\times10^{-2}, A_4=2.7648\times10^{-2},$
$A_5=-8.1647\times10^{-2}, A_6=2.7650\times10^{-2},$
$A_7=3.4848\times10^{-2}, A_8=-1.8828\times10^{-2},$
$A_9=-4.0905\times10^{-2}, A_{10}=2.5779\times10^{-2}$
$A_{11}=0, A_{12}=0,$
$A_{13}=0, A_{14}=0,$
$A_{15}=0, A_{16}=0$
(third surface)
$K=15.00753,$
$A_3=3.7908\times10^{-2}, A_4=-6.7878\times10^{-2},$
$A_5=1.1743\times10^{-2}, A_6=1.3739\times10^{-2},$
$A_7=-5.7311\times10^{-3}, A_8=-1.4851\times10^{-2},$
$A_9=-6.7008\times10^{-3}, A_{10}=9.5792\times10^{-3}$
$A_{11}=0, A_{12}=0,$
$A_{13}=0, A_{14}=0,$
$A_{15}=0, A_{16}=0$
(fourth surface)
$K=-0.35222,$
$A_3=7.3512\times10^{-2}, A_4=-3.3802\times10^{-2},$
$A_5=-2.0897\times10^{-3}, A_6=8.0265\times10^{-3},$
$A_7=-1.9788\times10^{-3}, A_8=-1.2087\times10^{-2},$
$A_9=-3.7764\times10^{-3}, A_{10}=1.7200\times10^{-2}$
$A_{11}=0, A_{12}=0,$
$A_{13}=0, A_{14}=0,$
$A_{15}=0, A_{16}=0$
(fifth surface)
$K=-0.63013,$
$A_3=2.9468\times10^{-2}, A_4=-4.1733\times10^{-2},$
$A_5=-1.8359\times10^{-2}, A_6=1.4500\times10^{-2},$
$A_7=1.1265\times10^{-2}, A_8=3.6633\times10^{-3},$
$A_9=5.3822\times10^{-4}, A_{10}=-1.5887\times10^{-3}$
$A_{11}=0, A_{12}=0,$
$A_{13}=0, A_{14}=0,$
$A_{15}=0, A_{16}=0$
(sixth surface)
$K=-6.17316,$
$A_3=5.0574\times10^{-2}, A_4=-1.5384\times10^{-1},$
$A_5=3.8851\times10^{-2}, A_6=1.8549\times10^{-2},$
$A_7=-8.4243\times10^{-4}, A_8=-3.0233\times10^{-3},$
$A_9=-9.1872\times10^{-4}, A_{10}=3.9158\times10^{-4}$
$A_{11}=0, A_{12}=0,$ $A_{13}=0, A_{14}=0,$
$A_{15}=0, A_{16}=0$
(seventh surface)
K=−0.97556,
$A_3=9.7678\times10^{-3}, A_4=-6.5119\times10^{-2},$
$A_5=3.1257\times10^{-3}, A_6=6.0270\times10^{-3},$
$A_7=1.0456\times10^{-3}, A_8=-5.0459\times10^{-4},$
$A_9=-2.2440\times10^{-4}, A_{10}=5.4202\times10^{-5}$
$A_{11}=0, A_{12}=0,$
$A_{13}=0, A_{14}=0,$
$A_{15}=0, A_{16}=0$ FIG. 14 is a spherical aberration diagram of the image lens according to the fifth embodiment. FIG. 15 is an astigmatism diagram in d-line (λ=587.56 nm) and a distortion diagram of the imaging lens according to the fifth embodiment. In the astigmatism diagram, S is the sagittal image surface; M is the meridional image surface.

Figure 16:
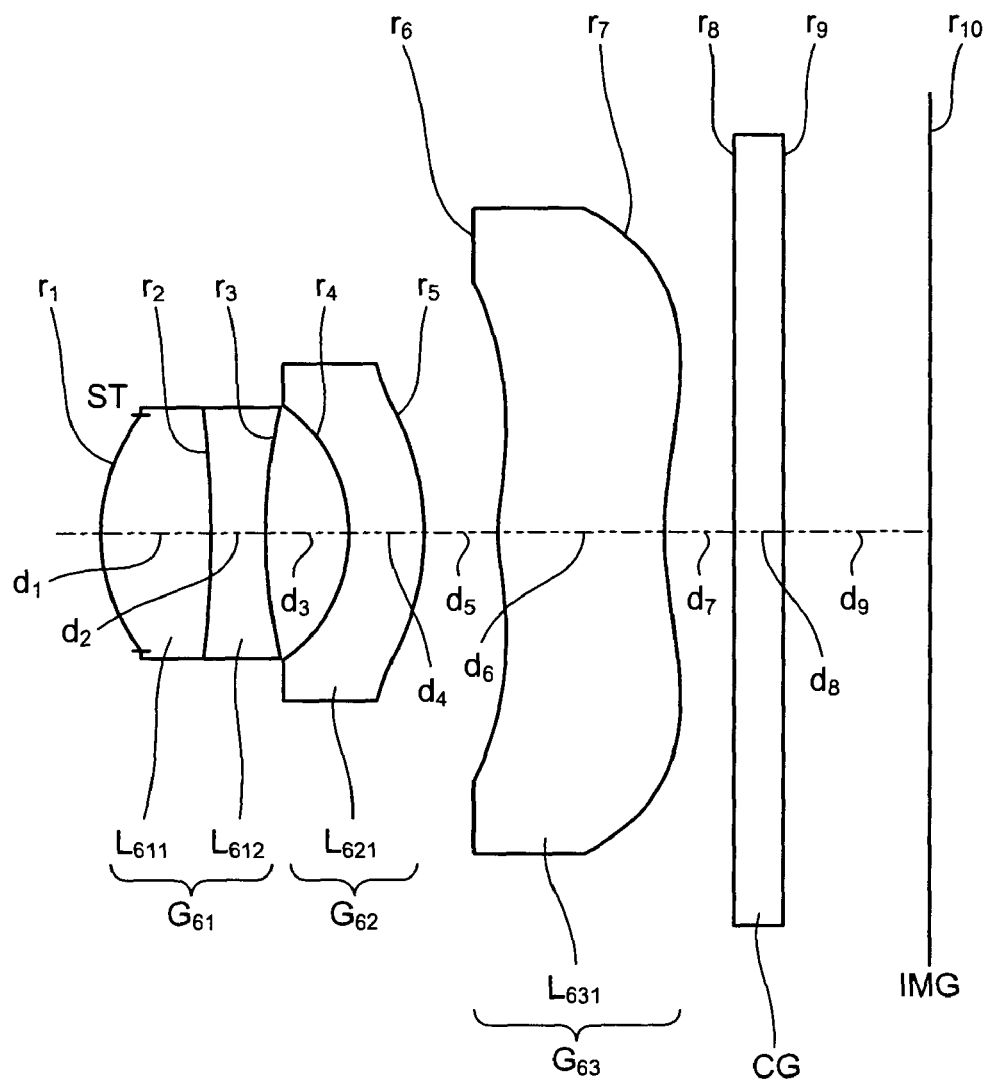
FIG. 16 is a cross-sectional view along the optical axis of an imaging lens according to a sixth embodiment.

FIG. 16 is a cross-sectional view along the optical axis of an imaging lens according to a sixth embodiment. The imaging lens includes sequentially from an object side which is not illustrated, a first lens group $G_{61}$, a second lens group $G_{62}$, and a third lens group $G_{63}$. Further, an aperture ST of a given diameter is provided near an object-side surface of the first lens group $G_{61}$. A cover glass CG formed by a parallel plate is arranged between the third lens group $G_{63}$ and an image plane IMG. Further, an optical receiving surface of an imaging element such as a CCD or a CMOS is arranged on the image plane IMG.

The first lens group $G_{61}$ includes sequentially from the object side, a first lens $L_{611}$ formed of resin and having a positive refractive power and a second lens $L_{612}$ formed of resin and having a negative refractive power, collectively forming a cemented lens having a positive refractive power.

The second lens group $G_{62}$ includes a negative meniscus lens $L_{621}$ whose convex surface is directed toward the image plane IMG. Further, the lens $L_{621}$ is preferably formed of resin.

The third lens group G63 includes a positive meniscus lens $L_{631}$ whose convex surface is directed toward the object side. Further, the lens $L_{631}$ is preferably formed of resin.

The object-side surface of the first lens $L_{611}$, the image-plane-IMG-side surface of the second lens $L_{612}$, both surfaces of the lens $L_{621}$, and both surfaces of the lens $L_{631}$ are aspherical.

Values concerning the imaging lens according to the sixth embodiment are given below.
The focal length of the imaging lens (f)=5.82
The F number=3.03
The diameter of the effective image circle of the imaging lens (2Y)=7.13
The focal length of the first lens group $G_{61}$ ($f_1$)=4.347
The focal length of the first lens $L_{611}$ of the first lens group $G_{61}$ ($f_{11}$)=2.674
The focal length of the second lens $L_{612}$ of the first lens group $G_{61}$ ($f_{12}$)=−5.353
The refractive index of d-line of the first lens $L_{611}$ of the first lens group $G_{61}$ ($n_1$)=1.525
The refractive index of d-line of the second lens $L_{612}$ of the first lens group $G_{61}$ ($n_2$)=1.586

(Values concerning conditional expression 1)

$f_1/f=0.747$ (Values concerning conditional expression 2)

$|f_{11}/f_{12}|=0.500$ (Values concerning conditional expression 3)

$n_2-n_1=0.061$ (Values concerning conditional expression 4)

Figure 17:
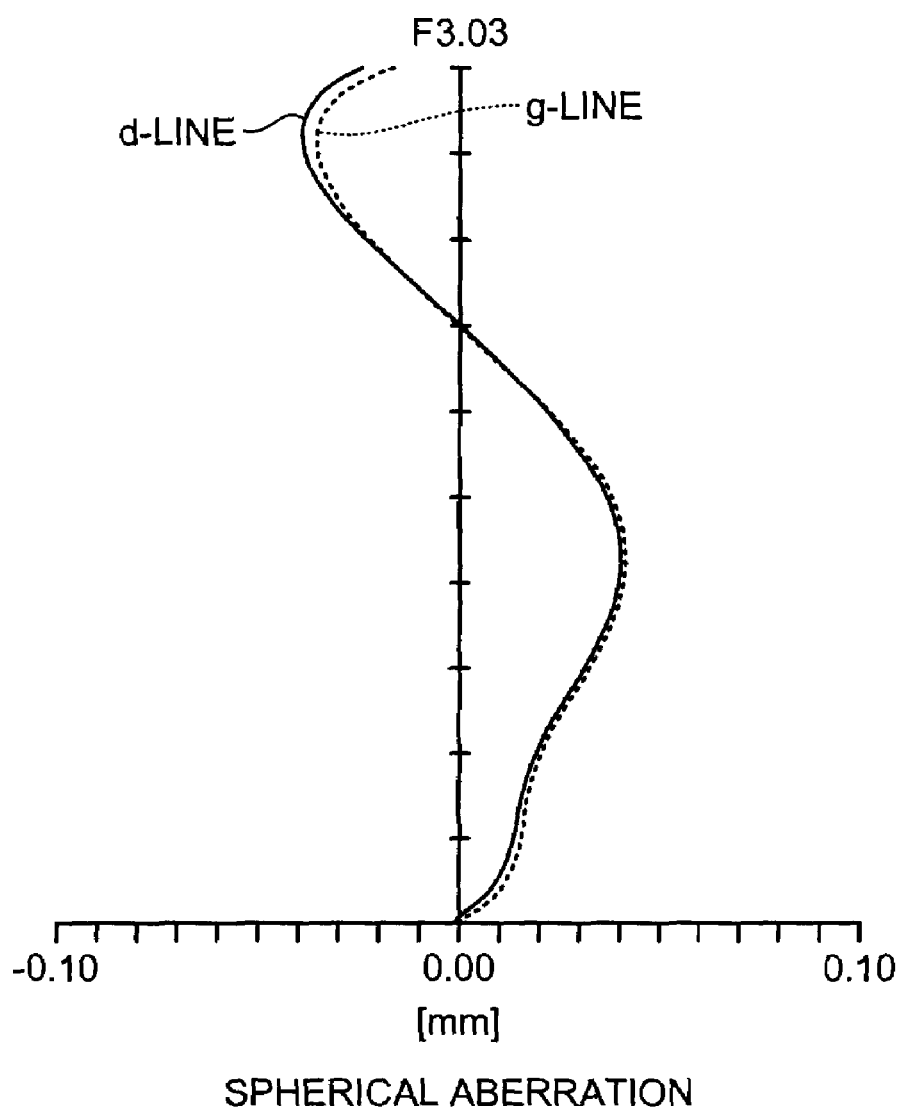
FIG. 17 is a spherical aberration diagram of the image lens according to the sixth embodiment.
Figure 18:
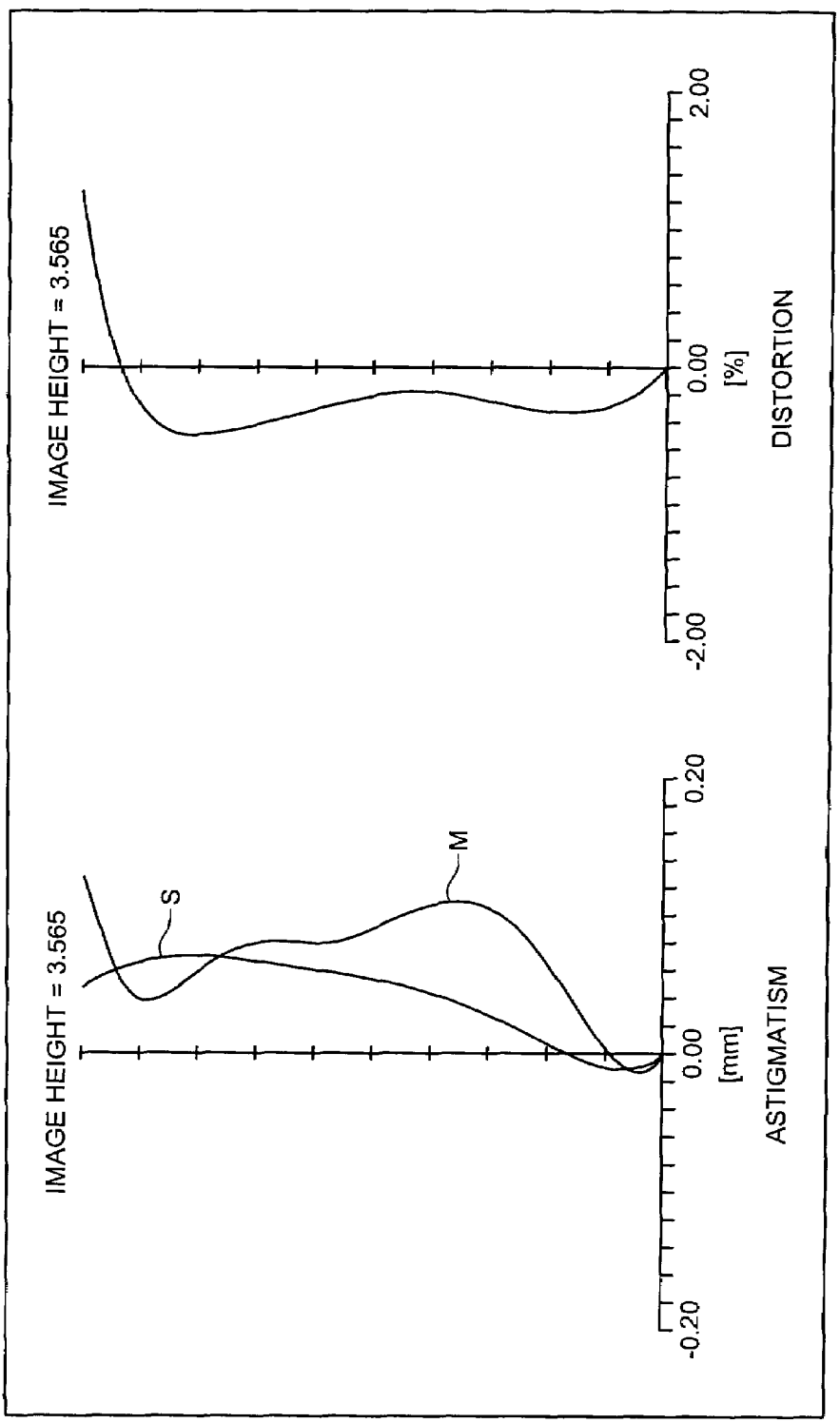
FIG. 18 is an astigmatism diagram in d-line ($\lambda$=587.56 nm) and a distortion diagram of the imaging lens according to the sixth embodiment.

$OP/2Y=0.90$ $r_1=1.66632$ (aspherical surface)
  $d_1=0.848$ $nd_1=1.525$ $vd_1=56.2$
$r_2=-7$
  $d_2=0.41$ $nd_2=1.586$ $vd_2=29.9$
$r_3=5.59044$ (aspherical surface)
  $d_3=0.641$
$r_4=-1.62924$ (aspherical surface)
  $d_4=0.585$ $nd_3=1.586$ $vd_3=29.9$
$r_5=-3.15569$ (aspherical surface)
  $d_5=0.577$
$r_6=2.72084$ (aspherical surface)
  $d_6=1.313$ $nd_4=1.525$ $vd_4=56.2$
$r_7=3.18876$ (aspherical surface)
  $d_7=0.50$
$r_8=\infty$
  $d_8=0.40$ $nd_5=1.518$ $vd_5=59.0$
$r_9=\infty$
  $d_9=1.127$
$r_{10}=\infty$ (image plane)
Constant of the cone (K) and Aspherical surface coefficient ($A_3, A_4, A_5, A_6, A_7, A_8, A_9, A_{10}, A_{11}, A_{12}, A_{13}, A_{14}, A_{15}, A_{16}$)
(first surface)
K=−3.01609,
$A_3=-1.0871\times10^{-3}, A_4=1.4032\times10^{-1},$
$A_5=-2.7001\times10^{-1}, A_6=5.9949\times10^{-1},$
$A_7=-7.2423\times10^{-1}, A_8=4.5980\times10^{-1},$
$A_9=-1.2424\times10^{-1}, A_{10}=5.6962\times10^{-3}$
$A_{11}=0, A_{12}=0,$
$A_{13}=0, A_{14}=0,$
$A_{15}=0, A_{16}=0$
(third surface)
K=16.67601,
$A_3=3.4965\times10^{-2}, A_4=-1.0709\times10^{-1},$
$A_5=2.1976\times10^{-1}, A_6=-3.4938\times10^{-1},$
$A_7=3.5735\times10^{-1}, A_8=-1.6788\times10^{-1},$
$A_9=2.6200\times10^{-3}, A_{10}=7.2397\times10^{-3}$
$A_{11}=0, A_{12}=0,$
$A_{13}=0, A_{14}=0,$
$A_{15}=0, A_{16}=0$
(fourth surface)
K=1.34207,
$A_3=-1.0281\times10^{-2}, A_4=-1.3368\times10^{-1},$
$A_5=3.3636\times10^{-1}, A_6=-3.1012\times10^{-1},$
$A_7=6.3608\times10^{-2}, A_8=1.3921\times10^{-1},$
$A_9=-4.2727\times10^{-2}, A_{10}=-1.5710\times10^{-2}$
$A_{11}=0, A_{12}=0,$
$A_{13}=0, A_{14}=0,$
$A_{15}=0, A_{16}=0$
(fifth surface)
K=1.95140,
$A_3=-6.7664\times10^{-2}, A_4=-3.6942\times10^{-2},$
$A_5=-1.5277\times10^{-2}, A_6=7.9071\times10^{-2},$
$A_7=-1.3201\times10^{-2}, A_8=-1.6839\times10^{-2},$
$A_9=1.1801\times10^{-2}, A_{10}=-1.6893\times10^{-4}$
$A_{11}=0, A_{12}=0,$
$A_{13}=0, A_{14}=0,$
$A_{15}=0, A_{16}=0$
(sixth surface)
K=−7.53571,
$A_3=-3.1177\times10^{-2}, A_4=-9.1640\times10^{-2},$
$A_5=2.4116\times10^{-2}, A_6=2.0426\times10^{-2},$
$A_7=-5.7047\times10^{-3}, A_8=-2.7220\times10^{-3},$
$A_9=1.4993\times10^{-4}, A_{10}=2.2020\times10^{-4},$
$A_{11}=5.1933\times10^{-5}, A_{12}=-2.2015\times10^{-7}$ $A_{11}=0, A_{12}=0,$
$A_{13}=0, A_{14}=0,$
$A_{15}=0, A_{16}=0$
(seventh surface)
K=−8.21118,
$A_3=−6.8201\times10^{−3}, A_4=−5.2624\times10^{−2},$
$A_5=1.4082\times10^{−2}, A_6=3.3509\times10^{−3},$
$A_7=−1.5835\times10^{−3}, A_8=−3.9331\times10^{−4},$
$A_9=1.5916\times10^{−4}, A_{10}=−1.9994\times10^{−5},$
$A_{11}=7.4056\times10^{−6}, A_{12}=−1.8077\times10^{−6}$
$A_{13}=0, A_{14}=0,$
$A_{15}=0, A_{16}=0$ FIG. 17 is a spherical aberration diagram of the image lens according to the sixth embodiment. FIG. 18 is an astigmatism diagram in d-line (λ=587.56 nm) and a distortion diagram of the imaging lens according to the sixth embodiment. In the astigmatism diagram, S is the sagittal image surface; M is the meridional image surface.

Figure 19:
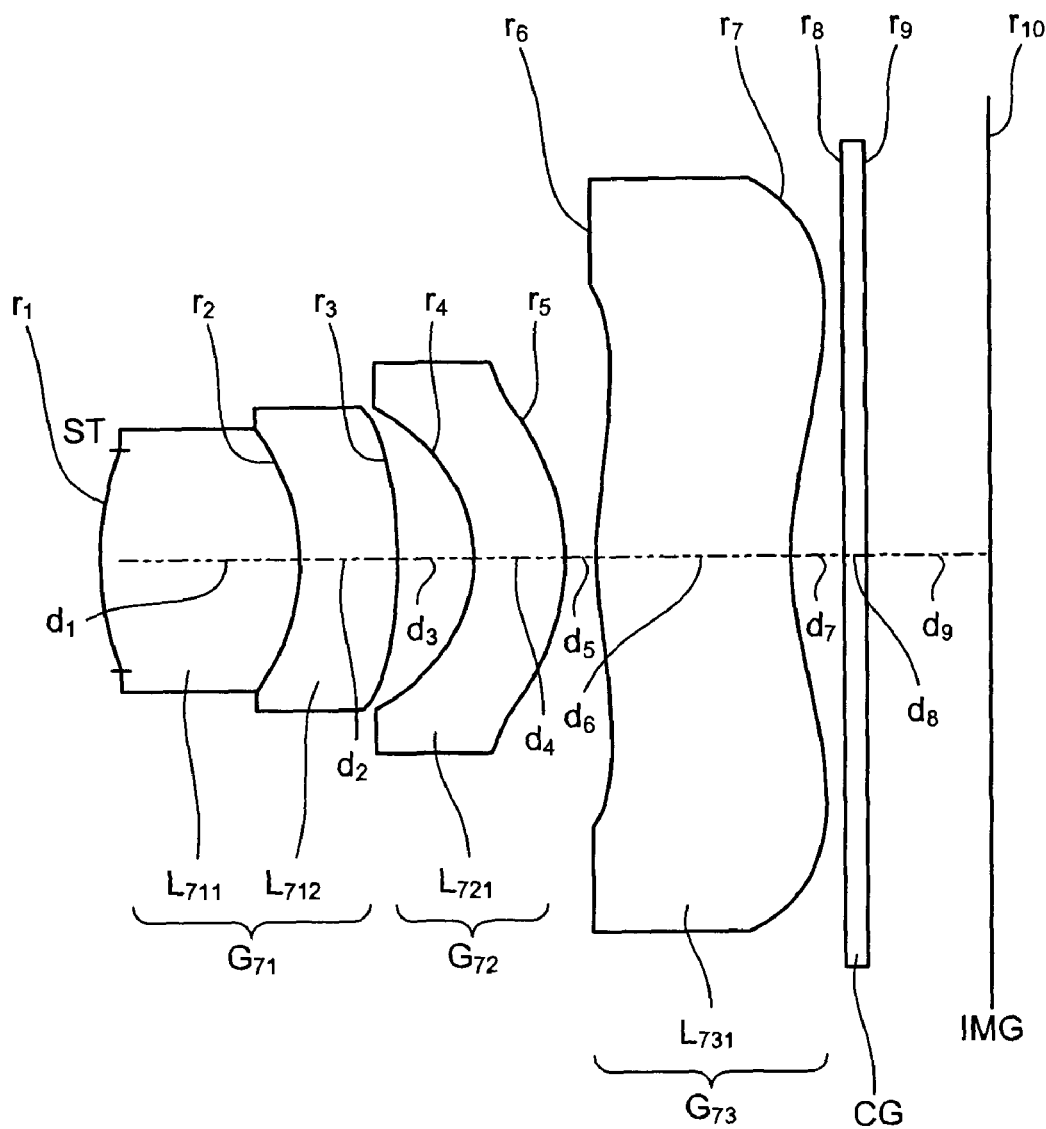
FIG. 19 is a cross-sectional view along the optical axis of an imaging lens according to a seventh embodiment.

FIG. 19 is a cross-sectional view along the optical axis of an imaging lens according to a seventh embodiment. The imaging lens includes sequentially from an object side which is not illustrated, a first lens group $G_{71}$, a second lens group $G_{72}$, and a third lens group $G_{73}$. Further, an aperture ST of a given diameter is provided near an object-side surface of the first lens group $G_{71}$. A cover glass CG formed by a parallel plate is arranged between the third lens group $G_{73}$ and an image plane IMG. Further, an optical receiving surface of an imaging element such as a CCD or a CMOS is arranged on the image plane IMG.

The first lens group $G_{71}$ includes sequentially from the object side, a first lens $L_{711}$ formed of resin and having a positive refractive power and a second lens $L_{712}$ formed of resin and having a negative refractive power, collectively forming a cemented lens having a positive refractive power.

The second lens group $G_{72}$ includes a negative meniscus lens $L_{721}$ whose convex surface is directed toward the image plane IMG. Further, the lens $L_{721}$ is preferably formed of resin.

The third lens group $G_{73}$ includes a positive meniscus lens $L_{731}$ whose convex surface is directed toward the object side. Further, the lens $L_{731}$ is preferably formed of resin.

The object-side surface of the first lens $L_{711}$, the image-plane-IMG-side surface of the second lens $L_{712}$, both surfaces of the lens $L_{721}$, and both surfaces of the lens $L_{731}$ are aspherical.

Values concerning the imaging lens according to the seventh embodiment are given below.
The focal length of the imaging lens (f)=5.55
The F number=2.93
The diameter of the effective image circle of the imaging lens (2Y)=7.76
The focal length of the first lens group $G_{51}$ ($f_1$)=4.148
The focal length of the first lens $L_{511}$ of the first lens group G51 ($f_{11}$)=2.478
The focal length of the second lens $L_{512}$ of the first lens group G51 ($f_{12}$)=−5.552
The refractive index of d-line of the first lens $L_{511}$ of the first lens group $G_{51}$ ($n_1$)=1.525
The refractive index of d-line of the second lens $L_{512}$ of the first lens group $G_{51}$ ($n_2$)=1.586
(Values concerning conditional expression 1)

$$f_1/f=0.748$$

(Values concerning conditional expression 2)

$$|f_{11}/f_{12}|=0.446$$

(Values concerning conditional expression 3)

$$n_2-n_1=0.061$$

(Values concerning conditional expression 4)

$$OP/2Y=0.93$$

Figure 20:
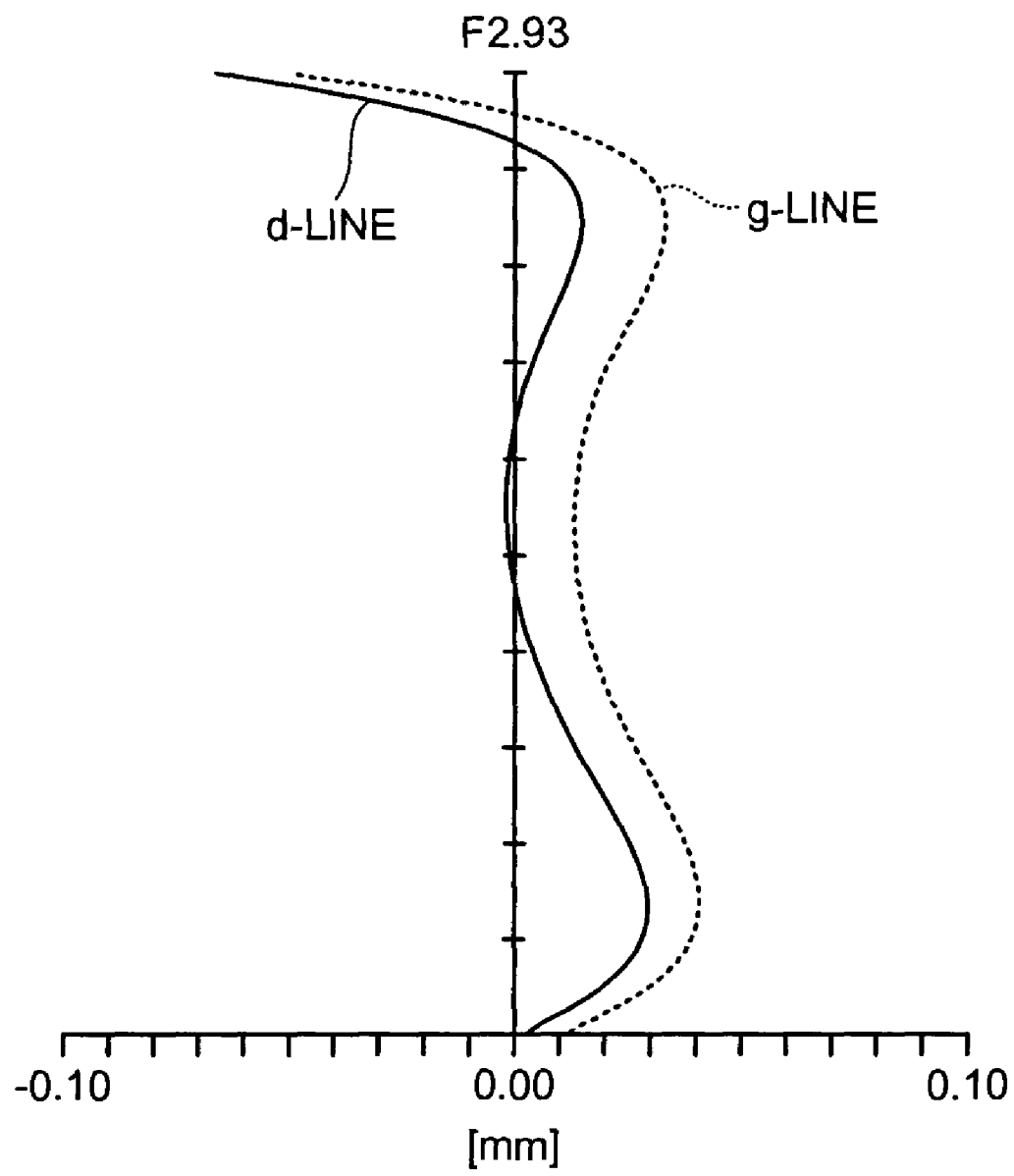
FIG. 20 is a spherical aberration diagram of the image lens according to the seventh embodiment.
Figure 21:
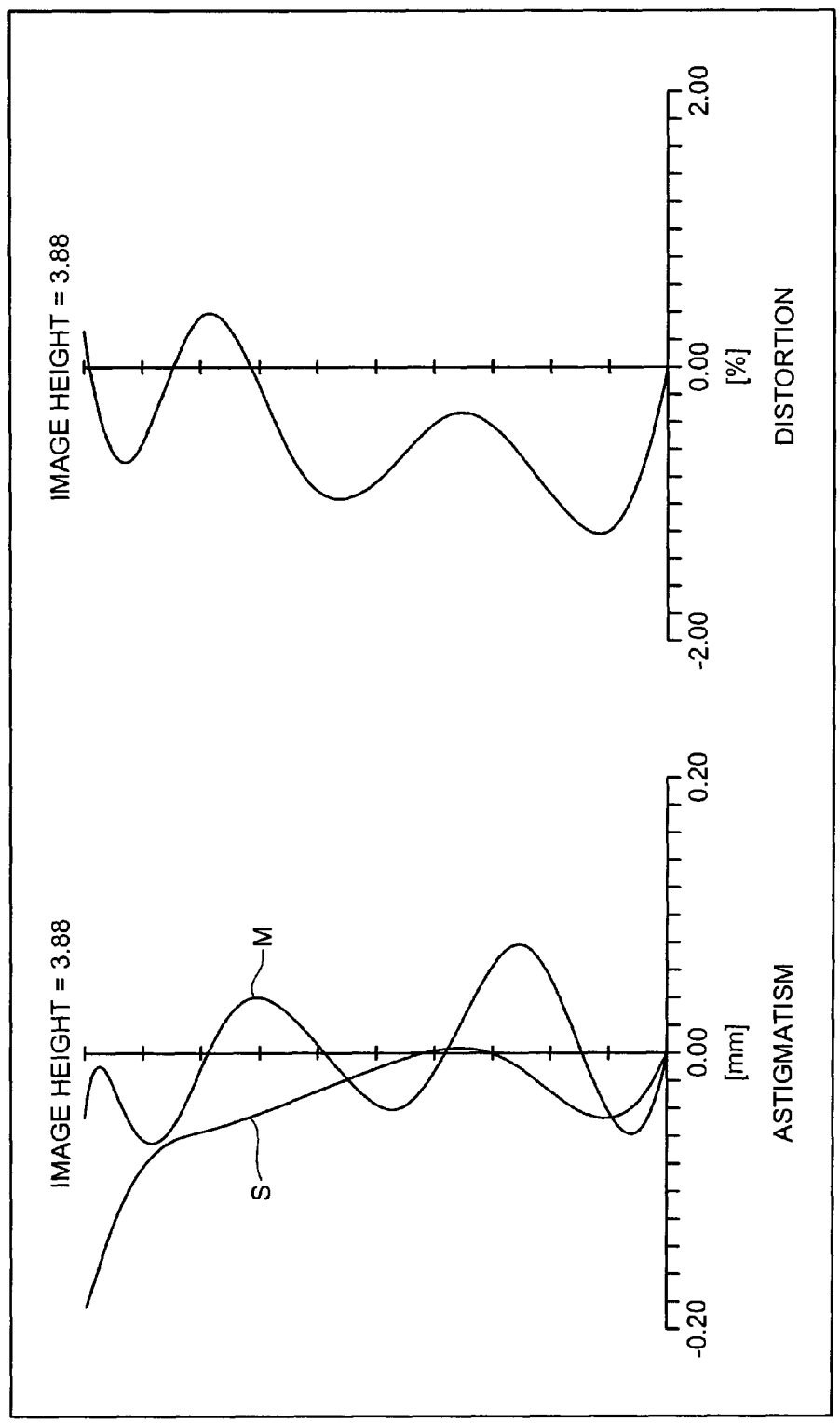
FIG. 21 is an astigmatism diagram in d-line (λ=587.56 nm) and a distortion diagram of the imaging lens according to the seventh embodiment.

$r_1$=2.65490 (aspherical surface)
  $d_1$=1.597 $nd_1$=1.525 $vd_1$=56.2
$r_2$=−2.02053
  $d_2$=0.81 $nd_2$=1.586 $vd_2$=29.9
$r_3$=−6.12879 (aspherical surface)
  $d_3$=0.624
$r_4$=−1.18289 (aspherical surface)
  $d_4$=0.728 $nd_3$=1.586 $vd_3$=29.9
$r_5$=−1.82113 (aspherical surface)
  $d_5$=0.243
$r_6$=2.9694 (aspherical surface)
  $d_6$=1.537 $nd_4$=1.525 $vd_4$=56.2
$r_7$=2.36034 (aspherical surface)
  $d_7$=0.49
$r_8$=∞
  $d_8$=0.16 $nd_5$=1.517 $vd_5$=64.2
$r_9$=∞
  $d_9$=1.001
$r_{10}$=∞ (image plane)
Constant of the cone (K) and Aspherical surface coefficient ($A_3, A_4, A_5, A_6, A_7, A_8, A_9, A_{10}, A_{11}, A_{12}, A_{13}, A_{14}, A_{15}, A_{16}$)
(first surface)
K=3.14560,
$A_3=−1.1554\times10^{−2}, A_4=2.7909\times10^{−2},$
$A_5=−8.1322\times10^{−2}, A_6=2.7960\times10^{−2},$
$A_7=3.5069\times10^{−2}, A_8=−1.8760\times10^{−2},$
$A_9=−4.1040\times10^{−2}, A_{10}=2.5394\times10^{−2}$
$A_{11}=0, A_{12}=0,$
$A_{13}=0, A_{14}=0,$
$A_{15}=0, A_{16}=0$
(third surface)
K=15.37508,
$A_3=3.8243\times10^{−2}, A_4=−6.8852\times10^{−2},$
$A_5=1.2500\times10^{−2}, A_6=1.3566\times10^{−2},$
$A_7=−6.0729\times10^{−3}, A_8=−1.5126\times10^{−2},$
$A_9=−6.8507\times10^{−3}, A_{10}=9.5490\times10^{−3}$
$A_{11}=0, A_{12}=0,$
$A_{13}=0, A_{14}=0,$
$A_{15}=0, A_{16}=0$
(fourth surface)
K=−0.33783,
$A_3=6.7024\times10^{−2}, A_4=−3.7942\times10^{−2},$
$A_5=−3.1040\times10^{−3}, A_6=8.3810\times10^{−3},$
$A_7=−2.2691\times10^{−4}, A_8=−1.190\times10^{−2},$
$A_9=−3.3813\times10^{−3}, A_{10}=1.7174\times10^{−2}$
$A_{11}=0, A_{12}=0,$
$A_{13}=0, A_{14}=0,$
$A_{15}=0, A_{16}=0$
(fifth surface)
K=−0.56503,
$A_3=2.7997\times10^{−2}, A_4=−4.2903\times10^{−2},$
$A_5=−1.8395\times10^{−2}, A_6=1.3989\times10^{−2},$
$A_7=1.0886\times10^{−2}, A_8=3.4923\times10^{−3},$
$A_9=5.1587\times10^{−4}, A_{10}=−1.5298\times10^{−3}$
$A_{11}=0, A_{12}=0,$
$A_{13}=0, A_{14}=0,$
$A_{15}=0, A_{16}=0$
(sixth surface)
K=−5.82771,
$A_3=5.4742\times10^{−2}, A_4=−1.5264\times10^{−1},$
$A_5=3.9188\times10^{−2}, A_6=1.8601\times10^{−2},$ $A_7=-6.4017\times10^{-4}, A_8=-3.0013\times10^{-3}$,
$A_9=-9.0033\times10^{-4}, A_{10}=4.6109\times10^{-4}$
$A_{11}=0, A_{12}=0$,
$A_{13}=0, A_{14}=0$,
$A_{15}=0, A_{16}=0$
(seventh surface)
K=−1.00965,
$A_3=1.0458\times10^{-2}, A_4=-6.5312\times10^{-2}$,
$A_5=2.9784\times10^{-3}, A_6=6.0879\times10^{-3}$,
$A_7=1.1105\times10^{-3}, A_8=-4.9924\times10^{-4}$,
$A_9=-2.2353\times10^{-4}, A_{10}=5.4487\times10^{-5}$
$A_{11}=0, A_{12}=0$,
$A_{13}=0, A_{14}=0$,
$A_{15}=0, A_{16}=0$ FIG. 20 is a spherical aberration diagram of the image lens according to the seventh embodiment. FIG. 21 is an astigmatism diagram in d-line (λ=587.56 nm) and a distortion diagram of the imaging lens according to the seventh embodiment. In the astigmatism diagram, S is the sagittal image surface; M is the meridional image surface.

Figure 22:
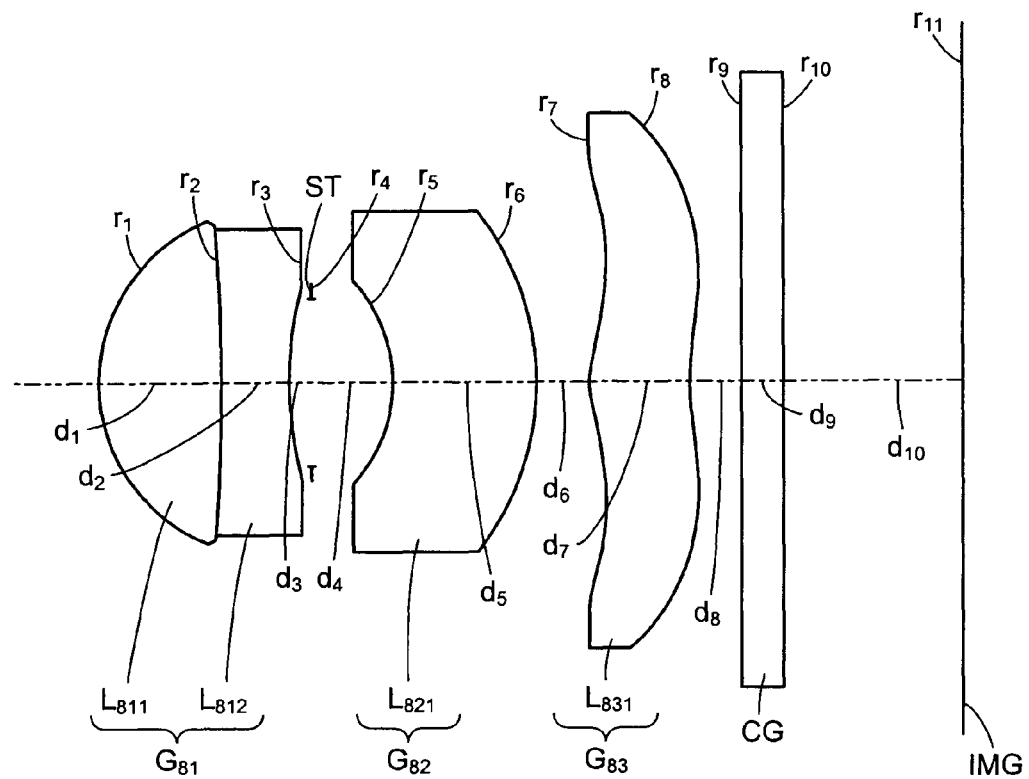
FIG. 22 is a cross-sectional view along the optical axis of an imaging lens according to an eighth embodiment.

FIG. 22 is a cross-sectional view along the optical axis of an imaging lens according to an eighth embodiment. The imaging lens includes sequentially from an object side which is not illustrated, a first lens group $G_{81}$, a second lens group $G_{82}$, and a third lens group $G_{83}$. Further, an aperture ST of a given diameter is provided in near an object-side surface of the first lens group $G_{81}$. A cover glass CG formed by a parallel plate is arranged between the third lens group $G_{83}$ and an image plane IMG. Further, an optical receiving surface of an imaging element such as a CCD or a CMOS is arranged on the image plane IMG.

The first lens group $G_{81}$ includes sequentially from the object side, a first lens $L_{811}$ formed of resin and having a positive refractive power and a second lens $L_{812}$ formed of resin and having a negative refractive power, collectively forming a cemented lens having a positive refractive power.

The second lens group $G_{82}$ includes a negative meniscus lens $L_{821}$ whose convex surface is directed toward the image plane IMG. Further, the lens $L_{821}$ is preferably formed of resin.

The third lens group $G_{83}$ includes a positive meniscus lens $L_{831}$ whose convex surface is directed toward the object side. Further, the lens $L_{831}$ is preferably formed of resin.

The object-side surface of the first lens $L_{811}$, the image-plane-IMG-side surface of the second lens $L_{812}$, both surfaces of the lens $L_{821}$, and both surfaces of the lens $L_{831}$ are aspherical.

Values concerning the imaging lens according to the eighth embodiment are given below.
The focal length of the imaging lens (f)=5.86
The F number=2.81
The diameter of the effective image circle of the imaging lens (2Y)=6.00
The focal length of the first lens group $G_{81}$ ($f_1$)=4.107
The focal length of the first lens $L_{811}$ of the first lens group $G_{81}$ ($f_{11}$)=2.642
The focal length of the second lens $L_{812}$ of the first lens group $G_{81}$ ($f_{12}$)=−5.230
The refractive index of d-line of the first lens $L_{811}$ of the first lens group $G_{81}$ ($n_1$)=1.531
The refractive index of d-line of the second lens $L_{812}$ of the first lens group $G_{81}$ ($n_2$)=1.585
(Values concerning conditional expression 1)

$f_1/f=0.701$ (Values concerning conditional expression 2)

$|f_{11}/f_{12}|=0.505$ (Values concerning conditional expression 3)

$n_2-n_1=0.054$ (Values concerning conditional expression 4)

Figure 23:
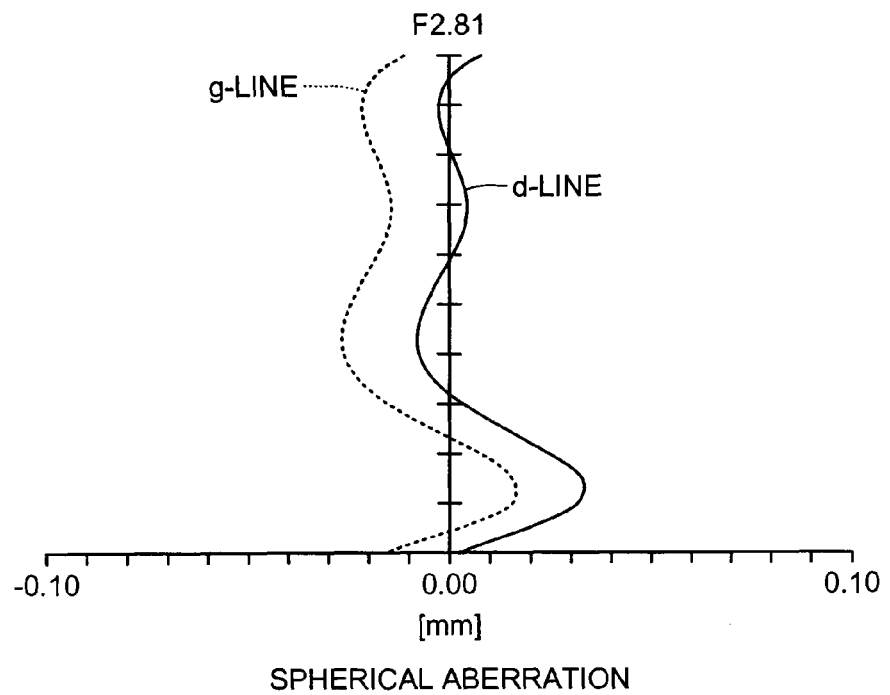
FIG. 23 is a spherical aberration diagram of the image lens according to the eighth embodiment.
Figure 24:
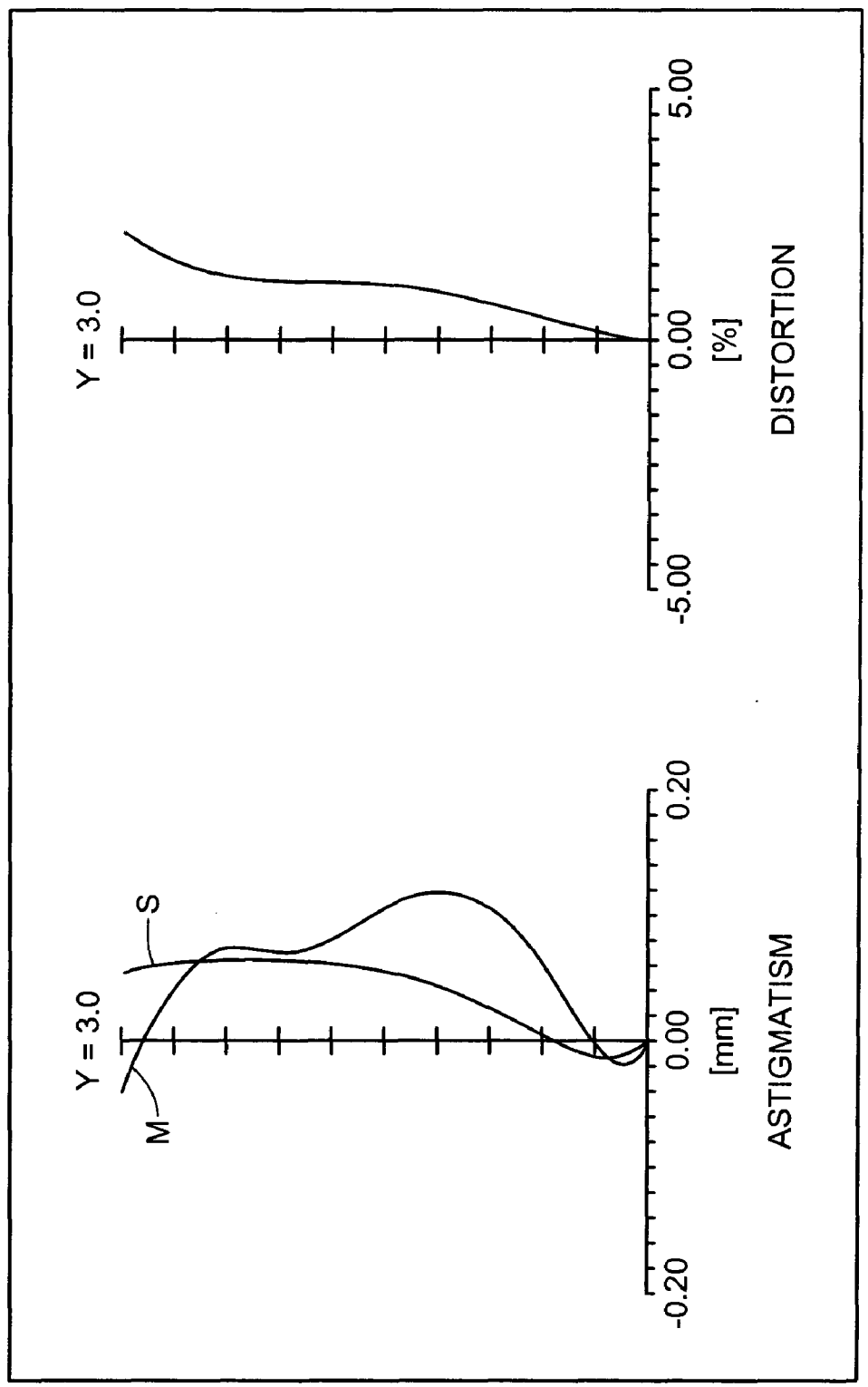
FIG. 24 is an astigmatism diagram in d-line (λ=587.56 nm) and a distortion diagram of the imaging lens according to the eighth embodiment.

$OP/2Y=1.05$ $r_1=1.52386$ (aspherical surface)
 $d_1=0.886$ $nd_1=1.531$ $vd_1=56.0$
$r_2=-14.19258$
 $d_2=0.500$ $nd_2=1.585$ $vd_2=29.9$
$r_3=3.95553$ (aspherical surface)
 $d_3=0.150$
$r_4=\infty$ (diaphragm aperture)
 $d_4=0.603$
$r_5=-1.52883$ (aspherical surface)
 $d_5=1.032$ $nd_3=1.585$ $vd_3=29.9$
$r_6=-3.54490$ (aspherical surface)
 $d_6=0.431$
$r_7=2.81042$ (aspherical surface)
 $d_7=0.688$ $nd_4=1.531$ $vd_4=56.0$
$r_8=4.75007$ (aspherical surface)
 $d_8=0.350$
$r_9=\infty$
 $d_9=0.300$ $nd_5=1.518$ $vd_5=59.0$
$r_{10}=\infty$
 $d_{10}=1.360$
$r_{11}=\infty$ (image plane)
Constant of the cone (K) and Aspherical surface coefficient $(A_3, A_4, A_5, A_6, A_7, A_8, A_9, A_{10}, A_{11}, A_{12}, A_{13}, A_{14}, A_{15}, A_{16})$
(first surface)
K=0.03011,
$A_3=-7.681\times10^{-4}, A_4=-1.451\times10^{-2}$,
$A_5=5.480\times10^{-2}, A_6=-6.288\times10^{-2}$,
$A_7=-3.507\times10^{-3}, A_8=4.884\times10^{-2}$,
$A_9=-1.041\times10^{-2}, A_{10}=-2.584\times10^{-2}$,
$A_{11}=1.717\times10^{-2}, A_{12}=-3.166\times10^{-3}$,
$A_{13}=0, A_{14}=0$,
$A_{15}=0, A_{16}=0$
(third surface)
K=−262.41070,
$A_3=7.066\times10^{-2}, A_4=2.098\times10^{-1}$,
$A_5=-3.580\times10^{-1}, A_6=2.568\times10^{-1}$,
$A_7=-1.781\times10^{-1}, A_8=-1.174\times10^{-1}$,
$A_9=4.417\times10^{-1}, A_{10}=1.513\times10^{-1}$,
$A_{11}=-8.188\times10^{-1}, A_{12}=4.381\times10^{-1}$,
$A_{13}=0, A_{14}=0$,
$A_{15}=0, A_{16}=0$
(fifth surface)
K=−0.20458,
$A_3=1.337\times10^{-1}, A_4=-1.109$,
$A_5=3.526, A_6=-5.780$,
$A_7=2.158, A_8=4.642$,
$A_9=-2.161, A_{10}=-7.334$,
$A_{11}=8.225, A_{12}=-2.568$,
$A_{13}=0, A_{14}=0$,
$A_{15}=0, A_{16}=0$
(sixth surface)
K=0,
$A_3=-3.131\times10^{-3}, A_4=-1.152\times10^{-1}$,
$A_5=2.164\times10^{-2}, A_6=5.931\times10^{-2}$,
$A_7=-2.705\times10^{-2}, A_8=-3.450\times10^{-2}$,
$A_9=6.309\times10^{-2}, A_{10}=-3.952\times10^{-2}$,
$A_{11}=1.001\times10^{-2}, A_{12}=-3.290\times10^{-4}$,
$A_{13}=0, A_{14}=0$,
$A_{15}=0, A_{16}=0$
(seventh surface)
K=−5.66349, $A_3=-1.143\times10^{-2}, A_4=-1.070\times10^{-1}$,
$A_5=3.556\times10^{-2}, A_6=-3.155\times10^{-2}$,
$A_7=2.765\times10^{-2}, A_8=3.026\times10^{-3}$,
$A_9=-5.272\times10^{-3}, A_{10}=-2.099\times10^{-3}$,
$A_{11}=1.982\times10^{-3}, A_{12}=-3.464\times10^{-4}$,
$A_{13}=0, A_{14}=0$,
$A_{15}=0, A_{16}=0$
(eighth surface)
K=0,
$A_3=1.309\times10^{-2}, A_4=-6.080\times10^{-2}$,
$A_5=-4.342\times10^{-2}, A_6=4.041\times10^{-2}$,
$A_7=-5.412\times10^{-3}, A_8=-4.385\times10^{-3}$,
$A_9=1.446\times10^{-3}, A_{10}=8.783\times10^{-4}$,
$A_{11}=-7.679\times10^{-4}, A_{12}=1.669\times10^{-4}$,
$A_{13}=0, A_{14}=0$,
$A_{15}=0, A_{16}=0$ FIG. 23 is a spherical aberration diagram of the image lens according to the eighth embodiment. FIG. 24 is an astigmatism diagram in d-line (λ=587.56 nm) and a distortion diagram of the imaging lens according to the eighth embodiment. In the astigmatism diagram, S is the sagittal image surface; M is the meridional image surface.

Figure 25:
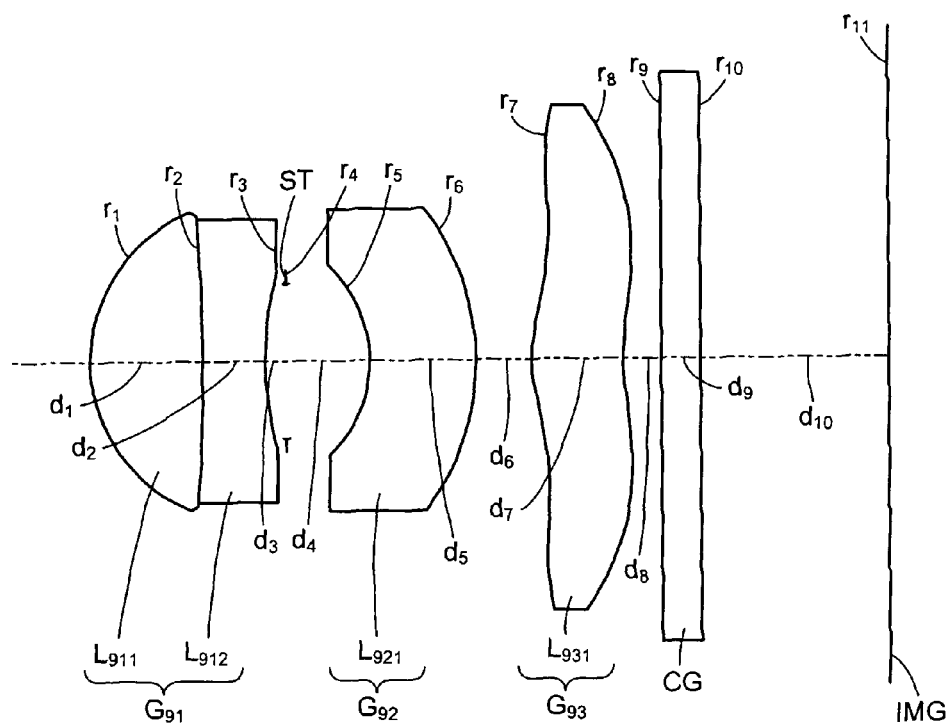
FIG. 25 is a cross-sectional view along the optical axis of an imaging lens according to a ninth embodiment.

FIG. 25 is a cross-sectional view along the optical axis of an imaging lens according to a ninth embodiment. The imaging lens includes sequentially from an object side which is not illustrated, a first lens group $G_{91}$, a second lens group $G_{92}$, and a third lens group $G_{93}$. Further, an aperture ST of a given diameter is provided in near an object-side surface of the first lens group $G_{91}$. A cover glass CG formed by a parallel plate is arranged between the third lens group $G_{93}$ and an image plane IMG. Further, an optical receiving surface of an imaging element such as a CCD or a CMOS is arranged on the image plane IMG.

The first lens group $G_{91}$ includes sequentially from the object side, a first lens $L_{911}$ formed of resin and having a positive refractive power and a second lens $L_{912}$ formed of resin and having a negative refractive power, collectively forming a cemented lens having a positive refractive power.

The second lens group $G_{92}$ includes a negative meniscus lens $L_{921}$ whose convex surface is directed toward the image plane IMG. Further, the lens $L_{921}$ is preferably formed of resin.

The third lens group $G_{93}$ includes a positive meniscus lens $L_{931}$ whose convex surface is directed toward the object side. Further, the lens $L_{931}$ is preferably formed of resin.

The object-side surface of the first lens $L_{911}$, the image-plane-IMG-side surface of the second lens $L_{912}$, both surfaces of the lens $L_{921}$, and both surfaces of the lens $L_{931}$ are aspherical.

Values concerning the imaging lens according to the ninth embodiment are given below.
The focal length of the imaging lens (f)=5.83
The F number=2.85
The diameter of the effective image circle of the imaging lens (2Y)=6.00
The focal length of the first lens group $G_{91}$ ($f_1$)=4.096
The focal length of the first lens $L_{911}$ of the first lens group $G_{91}$ ($f_{11}$)=2.721
The focal length of the second lens $L_{912}$ of the first lens group $G_{91}$ ($f_{12}$)=-5.861
The refractive index of d-line of the first lens $L_{911}$ of the first lens group $G_{91}$ ($n_1$)=1.531
The refractive index of d-line of the second lens $L_{912}$ of the first lens group $G_{91}$ ($n_2$)=1.614
(Values concerning conditional expression 1)

$f_1/f=0.703$ (Values concerning conditional expression 2)

$|f_{11}/f_{12}|=0.464$ (Values concerning conditional expression 3)

$n_2-n_1=0.083$ (Values concerning conditional expression 4)

Figure 26:
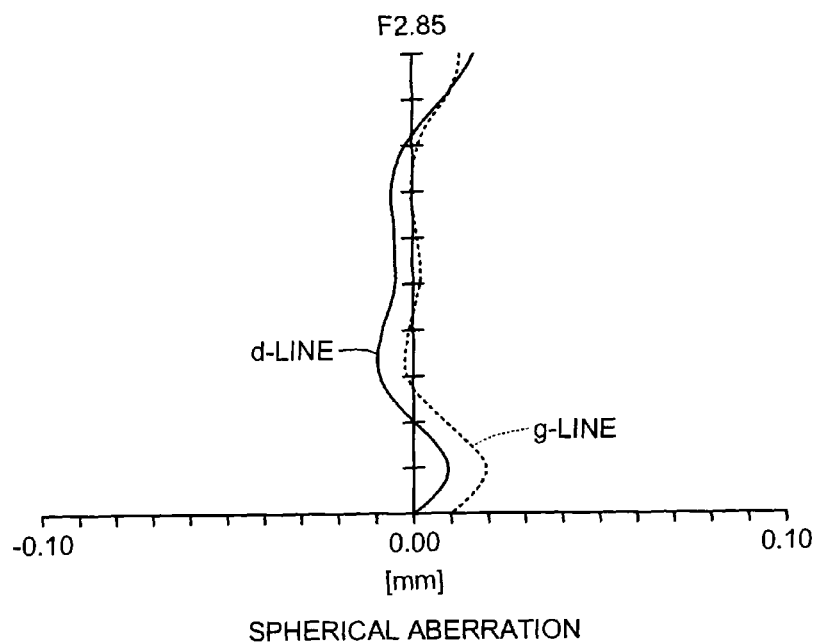
FIG. 26 is a spherical aberration diagram of the image lens according to the ninth embodiment.
Figure 27:
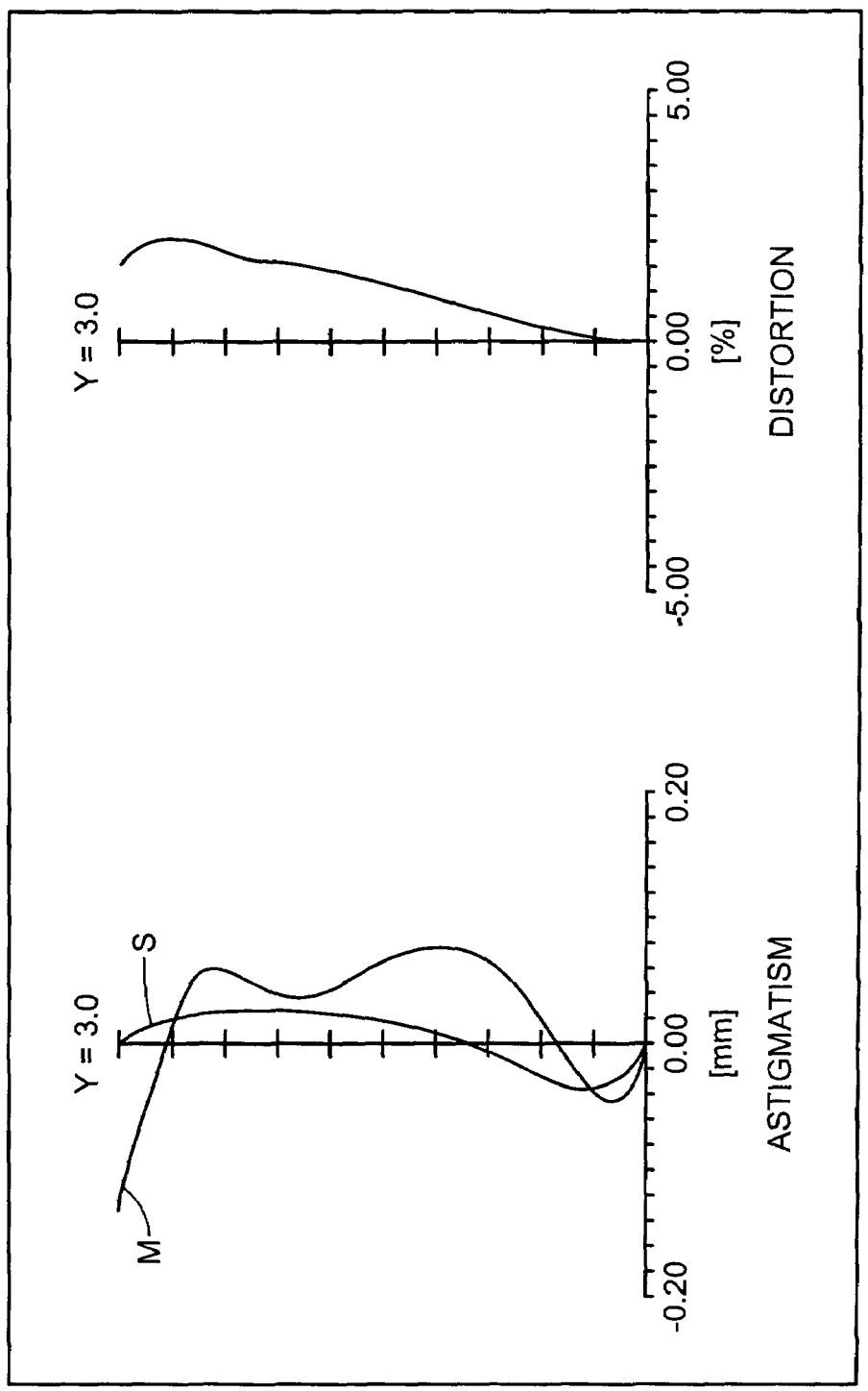
FIG. 27 is an astigmatism diagram in d-line (λ=587.56 nm) and a distortion diagram of the imaging lens according to the ninth embodiment.

$OP/2Y=1.04$ $r_1=1.59179$ (aspherical surface)
　$d_1=0.902$ $nd_1=1.531$ $vd_1=56.0$
$r_2=-12.61783$
　$d_2=0.500$ $nd_2=1.614$ $vd_2=26.0$
$r_3=5.11334$ (aspherical surface)
　$d_3=0.150$
$r_4=\infty$ (diaphragm aperture)
　$d_4=0.672$
$r_5=-1.38250$ (aspherical surface)
　$d_5=0.820$ $nd_3=1.585$ $vd_3=29.9$
$r_6=-3.53554$ (aspherical surface)
　$d_6=0.452$
$r_7=2.28927$ (aspherical surface)
　$d_7=0.713$ $nd_4=1.531$ $vd_4=56.0$
$r_8=4.30289$ (aspherical surface)
　$d_8=0.350$
$r_9=\infty$
　$d_9=0.300$ $nd_5=1.518$ $vd_5=59.0$
$r_{10}=\infty$
　$d_{10}=1.404$
$r_{11}=\infty$ (image plane)
Constant of the cone (K) and Aspherical surface coefficient ($A_3, A_4, A_5, A_6, A_7, A_8, A_9, A_{10}, A_{11}, A_{12}, A_{13}, A_{14}, A_{15}, A_{16}$)
(first surface)
K=-0.38370,
$A_3=3.924\times10^{-3}, A_4=-1.678\times10^{-2}$,
$A_5=7.203\times10^{-2}, A_6=-6.170\times10^{-2}$,
$A_7=-1.017\times10^{-2}, A_8=4.598\times10^{-2}$,
$A_9=-8.564\times10^{-3}, A_{10}=-2.197\times10^{-2}$,
$A_{11}=1.924\times10^{-2}, A_{12}=-6.001\times10^{-3}$,
$A_{13}=0, A_{14}=0$,
$A_{15}=0, A_{16}=0$
(third surface)
K=-520.91900,
$A_3=5.803\times10^{-2}, A_4=2.017\times10^{-1}$,
$A_5=-4.002\times10^{-1}, A_6=2.411\times10^{-1}$,
$A_7=-1.650\times10^{-1}, A_8=-3.943\times10^{-2}$,
$A_9=4.816\times10^{-1}, A_{10}=8.477\times10^{-2}$,
$A_{11}=-9.535\times10^{-1}, A_{12}=5.218\times10^{-1}$,
$A_{13}=0, A_{14}=0$,
$A_{15}=0, A_{16}=0$
(fifth surface)
K=-0.29894,
$A_3=1.182\times10^{-1}, A_4=-1.111$,
$A_5=3.518, A_6=-5.817$,
$A_7=2.154, A_8=4.737$,
$A_9=-2.082, A_{10}=-7.431$,
$A_{11}=7.955, A_{12}=-2.334$,
$A_{13}=0, A_{14}=0$,
$A_{15}=0, A_{16}=0$
(sixth surface)
K=0,
$A_3=-1.581\times10^{-2}, A_4=-1.386\times10^{-1}$,
$A_5=2.287\times10^{-2}, A_6=7.495\times10^{-2}$,
$A_7=-2.241\times10^{-2}, A_8=-3.733\times10^{-2}$,
$A_9=6.006\times10^{-2}, A_{10}=-3.983\times10^{-2}$,
$A_{11}=1.229\times10^{-2}, A_{12}=-9.645\times10^{-4}$,
$A_{13}=0, A_{14}=0$, $A_{15}=0, A_{16}=0$
(seventh surface)
$K=-4.88849$,
$A_3=-1.284\times10^{-2}, A_4=-1.053\times10^{-1}$,
$A_5=3.798\times10^{-2}, A_6=-2.990\times10^{-2}$,
$A_7=2.833\times10^{-2}, A_8=3.006\times10^{-3}$,
$A_9=-5.488\times10^{-3}, A_{10}=-2.247\times10^{-3}$,
$A_{11}=1.945\times10^{-3}, A_{12}=-3.121\times10^{-4}$,
$A_{13}=0, A_{14}=0$,
$A_{15}=0, A_{16}=0$
(eighth surface)
$K=0$,
$A_3=1.263\times10^{-2}, A_4=-5.937\times10^{-2}$,
$A_5=-4.202\times10^{-2}, A_6=4.038\times10^{-2}$,
$A_7=-5.795\times10^{-3}, A_8=-4.555\times10^{-3}$,
$A_9=1.535\times10^{-3}, A_{10}=1.003\times10^{-3}$,
$A_{11}=-7.272\times10^{-4}, A_{12}=1.272\times10^{-4}$,
$A_{13}=0, A_{14}=0$,
$A_{15}=0, A_{16}=0$ FIG. 26 is a spherical aberration diagram of the image lens according to the ninth embodiment. FIG. 27 is an astigmatism diagram in d-line ($\lambda$=587.56 nm) and a distortion diagram of the imaging lens according to the ninth embodiment. In the astigmatism diagram, S is the sagittal image surface; M is the meridional image surface.

Figure 28:
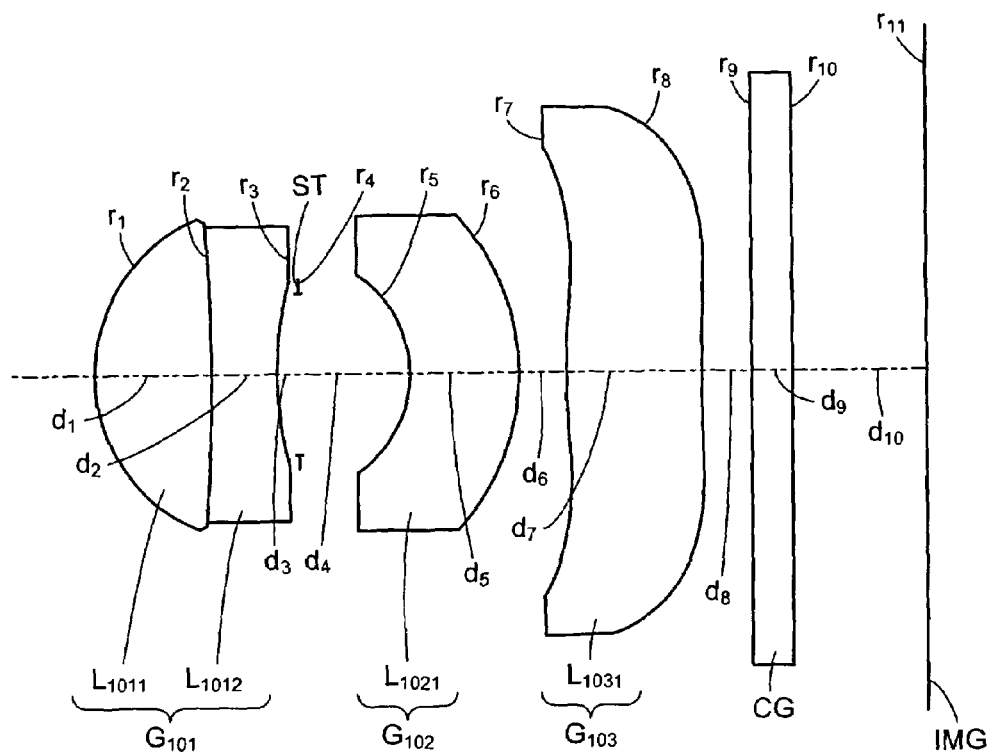
FIG. 28 is a cross-sectional view along the optical axis of an imaging lens according to a tenth embodiment.

FIG. 28 is a cross-sectional view along the optical axis of an imaging lens according to a tenth embodiment. The imaging lens includes sequentially from an object side which is not illustrated, a first lens group $G_{101}$, a second lens group $G_{102}$, and a third lens group $G_{103}$. Further, an aperture ST of a given diameter is provided in near an object-side surface of the first lens group $G_{101}$. A cover glass CG formed by a parallel plate is arranged between the third lens group $G_{103}$ and an image plane IMG. Further, an optical receiving surface of an imaging element such as a CCD or a CMOS is arranged on the image plane IMG.

The first lens group $G_{101}$ includes sequentially from the object side, a first lens $L_{1011}$ formed of resin and having a positive refractive power and a second lens $L_{1012}$ formed of resin and having a negative refractive power, collectively forming a cemented lens having a positive refractive power.

The second lens group $G_{102}$ includes a negative meniscus lens $L_{1021}$ whose convex surface is directed toward the image plane IMG. Further, the lens $L_{1021}$ is preferably formed of resin.

The third lens group $G_{103}$ includes a positive meniscus lens $L_{1031}$ whose convex surface is directed toward the object side. Further, the lens $L_{1031}$ is preferably formed of resin.

The object-side surface of the first lens $L_{1011}$, the image-plane-IMG-side surface of the second lens $L_{1012}$, both surfaces of the lens $L_{1021}$, and both surfaces of the lens $L_{1031}$ are aspherical.

Values concerning the imaging lens according to the tenth embodiment are given below.
The focal length of the imaging lens (f)=5.85
The F number=2.77
The diameter of the effective image circle of the imaging lens (2Y)=6.00
The focal length of the first lens group $G_{101}$ ($f_1$)=4.052
The focal length of the first lens $L_{1011}$ of the first lens group $G_{101}$ ($f_{11}$)=2.619
The focal length of the second lens $L_{1012}$ of the first lens group $G_{31}$ ($f_{12}$)=-5.260
The refractive index of d-line of the first lens $L_{1011}$ of the first lens group $G_{101}$ ($n_1$)=1.525
The refractive index of d-line of the second lens $L_{1012}$ of the first lens group $G_{101}$ ($n_2$)=1.614

(Values concerning conditional expression 1)

$f_1/f$=0.693

(Values concerning conditional expression 2)

$|f_{11}/f_{12}|$=0.498

(Values concerning conditional expression 3)

$n_2-n_1$=0.090

(Values concerning conditional expression 4)

$OP/2Y$=1.02

Figure 29:
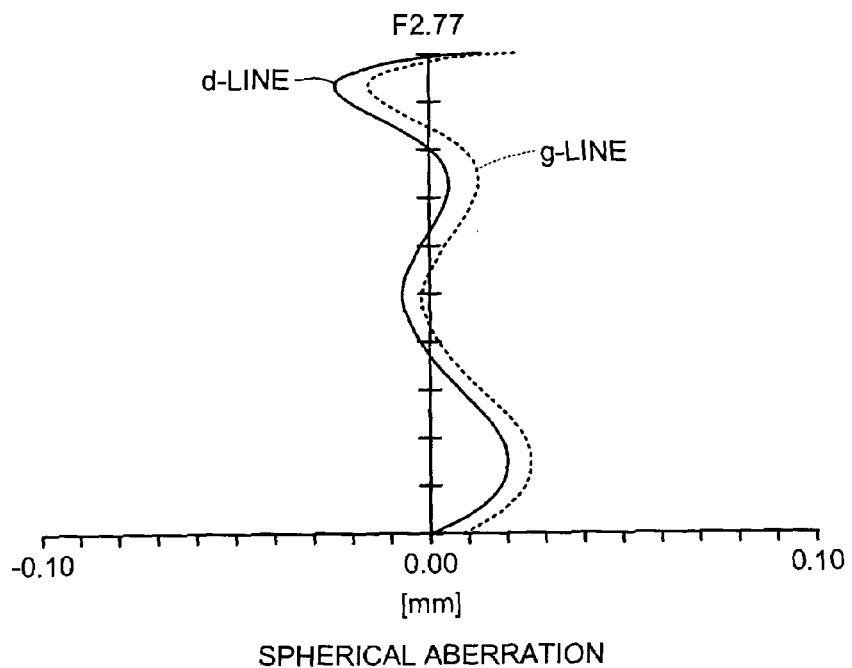
FIG. 29 is a spherical aberration diagram of the image lens according to the tenth embodiment.
Figure 30:
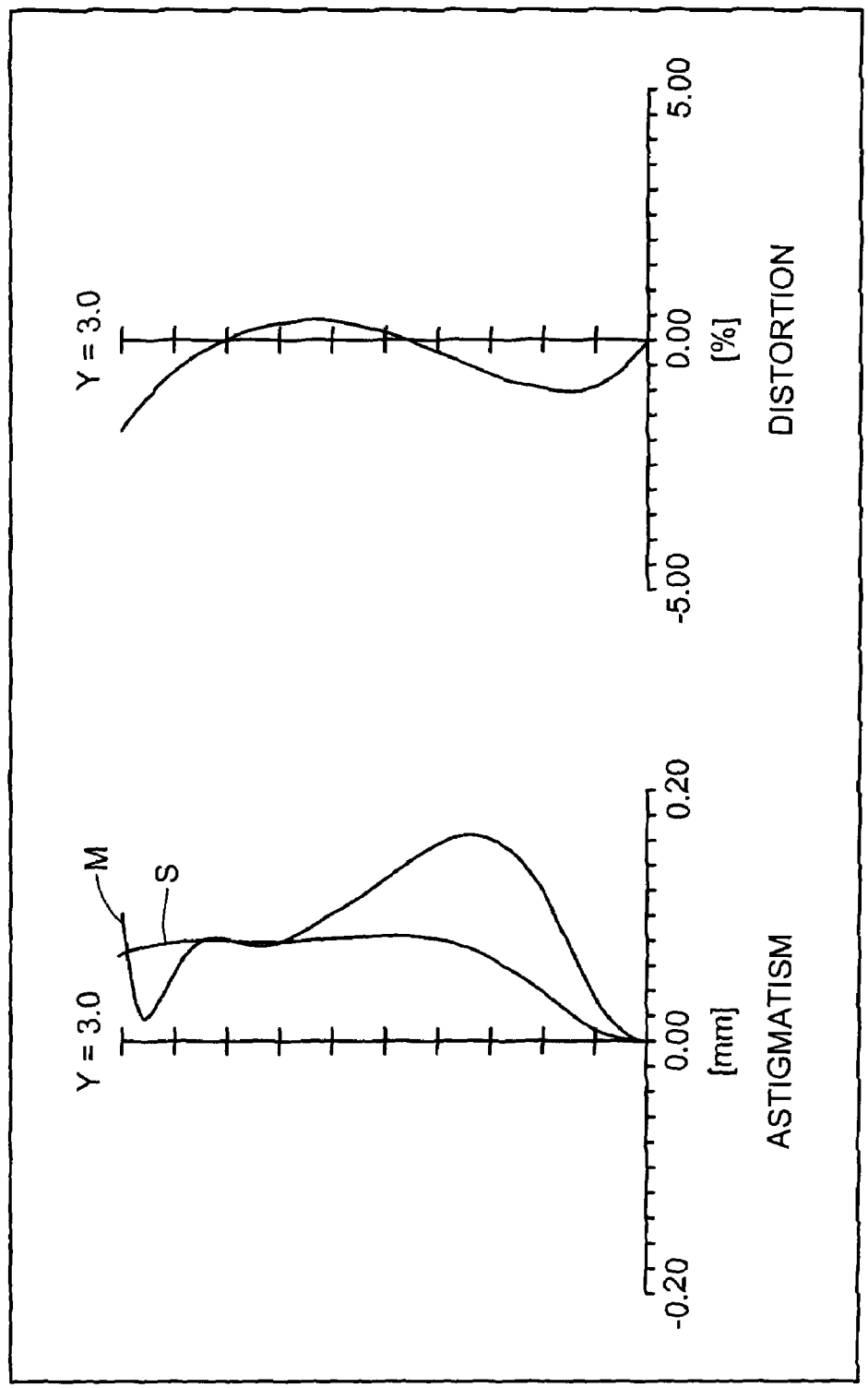
FIG. 30 is an astigmatism diagram in d-line (λ=587.56 nm) and a distortion diagram of the imaging lens according to the tenth embodiment.

$r_1$=1.50641 (aspherical surface)
  $d_1$=0.891 $nd_1$=1.525 $vd_1$=56.2
$r_2$=-12.47284
  $d_2$=0.500 $nd_2$=1.614 $vd_2$=26.0
$r_3$=4.42756 (aspherical surface)
  $d_3$=0.115
$r_4$=∞ (diaphragm aperture)
  $d_4$=0.812
$r_5$=-1.45975 (aspherical surface)
  $d_5$=0.800 $nd_3$=1.585 $vd_3$=29.9
$r_6$=-3.55180 (aspherical surface)
  $d_6$=0.326
$r_7$=4.13906 (aspherical surface)
  $d_7$=1.004 $nd_4$=1.525 $vd_4$=56.2
$r_8$=13.09039 (aspherical surface)
  $d_8$=0.350
$r_9$=∞
  $d_9$=0.300 $nd_5$=1.518 $vd_5$=59.0
$r_{10}$=∞
  $d_{10}$=1.017
$r_{11}$=∞ (image plane)
Constant of the cone (K) and Aspherical surface coefficient ($A_3, A_4, A_5, A_6, A_7, A_8, A_9, A_{10}, A_{12}, A_{13}, A_{14}, A_{15}, A_{16}$)
(first surface)
$K$=0.03232,
$A_3=-1.366\times10^{-2}, A_4=9.175\times10^{-3}$,
$A_5=-3.269\times10^{-3}, A_6=-3.712\times10^{-3}$,
$A_7=-2.665\times10^{-4}, A_8=-9.958\times10^{-4}$,
$A_9=1.409\times10^{-4}, A_{10}=-3.944\times10^{-4}$,
$A_{11}=-3.339\times10^{-4}, A_{12}=-2.466\times10^{-4}$,
$A_{13}=-1.169\times10^{-4}, A_{14}=-5.159\times10^{-5}$,
$A_{15}=0, A_{16}=0$
(third surface)
$K$=4.32446,
$A_3=-1.857\times10-2, A_4=-4.372\times10^{-3}$,
$A_5=2.865\times10^{-2}, A_6=2.531\times10^{-2}$,
$A_7=4.069\times10^{-3}, A_8=-2.507\times10^{-2}$,
$A_9=-4.423\times10^{-2}, A_{10}=-1.167\times10^{-1}$,
$A_{11}=-2.360\times10^{-2}, A_{12}=8.326\times10^{-2}$,
$A_{13}=6.333\times10^{-2}, A_{14}=1.093\times10^{-1}$,
$A_{15}=0, A_{16}=0$
(fifth surface)
$K$=0.08789,
$A_3=-4.653\times10^{-2}, A_4=1.952\times10^{-3}$,
$A_5=-5.207\times10^{-2}, A_6=-1.423\times10^{-1}$,
$A_7=-4.992\times10^{-2}, A_8=-3.308\times10^{-2}$,
$A_9=5.644\times10^{-2}, A_{10}=9.454\times10^{-2}$,
$A_{11}=7.390\times10^{-2}, A_{12}=2.442\times10^{-2}$,
$A_{13}=-8.387\times10^{-2}, A_{14}=-1.935\times10^{-1}$,
$A_{15}=0, A_{16}=0$
(sixth surface)
$K$=1.38948,
$A_3=-6.625\times10^{-2}, A_4=-3.120\times10^{-2}$,
$A_5=5.154\times10^{-3}, A_6=-2.099\times10^{-2}$,
$A_7=5.391\times10^{-3}, A_8=7.214\times10^{-3}$, $A_9=1.780\times10^{-3}, A_{10}=1.782\times10^{-3},$
$A_{11}=-6.889\times10^{-4}, A_{12}=-6.510\times10^{-4},$
$A_{13}=5.390\times10^{-4}, A_{14}=4.584\times10^{-6},$
$A_{15}=0, A_{16}=0$
(seventh surface)
$K=-87.06180,$
$A_3=5.566\times10^{-3}, A_4=-3.329\times10^{-2},$
$A_5=-5.018\times10^{-3}, A_6=-6.864\times10^{-3},$
$A_7=1.668\times10^{-3}, A_8=2.155\times10^{-3},$
$A_9=1.203\times10^{-3}, A_{10}=1.028\times10^{-3},$
$A_{11}=-4.414\times10^{-4}, A_{12}=-3.270\times10^{-4},$
$A_{13}=-1.650\times10^{-4}, A_{14}=1.142\times10^{-4},$
$A_{15}=0, A_{16}=0$
(eighth surface)
$K=5.33682,$
$A_3=-9.203\times10^{-3}, A_4=-1.216\times10^{-2},$
$A_5=-5.377\times10^{-3}, A_6=-8.844\times10^{-4},$
$A_7=-1.390\times10^{-4}, A_8=-1.337\times10^{-4},$
$A_9=1.498\times10^{-4}, A_{10}=-1.670\times10^{-5},$
$A_{11}=2.596\times10^{-5}, A_{12}=1.394\times10^{-5},$
$A_{13}=-4.734\times10^{-6}, A_{14}=-3.371\times10^{-6},$
$A_{15}=0, A_{16}=0$ FIG. 29 is a spherical aberration diagram of the image lens according to the tenth embodiment. FIG. 30 is an astigmatism diagram in d-line ($\lambda$=587.56 nm) and a distortion diagram of the imaging lens according to the tenth embodiment. In the astigmatism diagram, S is the sagittal image surface; M is the meridional image surface.

Figure 31:
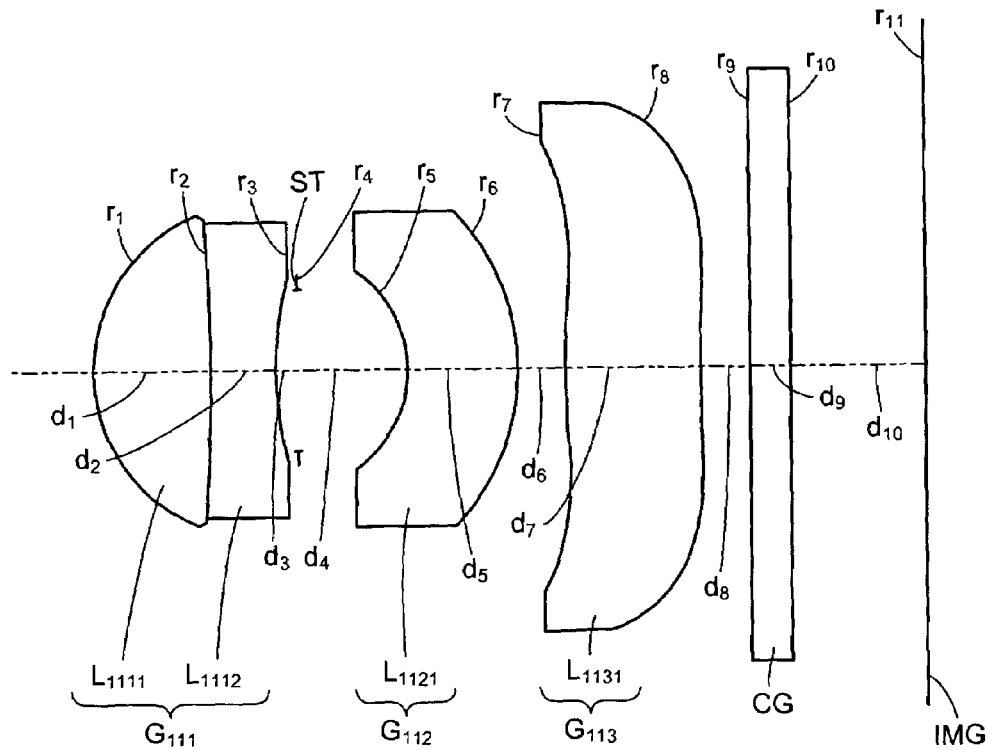
FIG. 31 is a cross-sectional view along the optical axis of an imaging lens according to an eleventh embodiment.

FIG. 31 is a cross-sectional view along the optical axis of an imaging lens according to an eleventh embodiment. The imaging lens includes sequentially from an object side which is not illustrated, a first lens group $G_{111}$, a second lens group $G_{112}$, and a third lens group $G_{113}$. Further, an aperture ST of a given diameter is provided in near an object-side surface of the first lens group $G_{111}$. A cover glass CG formed by a parallel plate is arranged between the third lens group $G_{113}$ and an image plane IMG. Further, an optical receiving surface of an imaging element such as a CCD or a CMOS is arranged on the image plane IMG.

The first lens group $G_{111}$ includes sequentially from the object side, a first lens $L_{1111}$ formed of resin and having a positive refractive power and a second lens $L_{1112}$ formed of resin and having a negative refractive power, collectively forming a cemented lens having a positive refractive power.

The second lens group $G_{112}$ includes a negative meniscus lens $L_{1121}$ whose convex surface is directed toward the image plane IMG. Further, the lens $L_{1121}$ is preferably formed of resin.

The third lens group $G_{113}$ includes a positive meniscus lens $L_{1131}$ whose convex surface is directed toward the object side. Further, the lens $L_{1131}$ is preferably formed of resin.

The object-side surface of the first lens $L_{1111}$, the image-plane-IMG-side surface of the second lens $L_{1112}$, both surfaces of the lens $L_{1121}$, and both surfaces of the lens $L_{1131}$ are aspherical.

Values concerning the imaging lens according to the eleventh embodiment are given below.
The focal length of the imaging lens (f)=5.92
The F number=2.84
The diameter of the effective image circle of the imaging lens (2Y)=6.00
The focal length of the first lens group $G_{111}$ ($f_1$)=4.053
The focal length of the first lens $L_{1111}$ of the first lens group $G_{111}$ ($f_{11}$)=2.449
The focal length of the second lens $L_{1112}$ of the first lens group $G_{111}$ ($f_{12}$)=−4.504
The refractive index of d-line of the first lens $L_{1111}$ of the first lens group $G_{111}$ ($n_1$)=1.525
The refractive index of d-line of the second lens $L_{1112}$ of the first lens group $G_{111}$ ($n_2$)=1.585
(Values concerning conditional expression 1)

$$f_1/f=0.685$$

(Values concerning conditional expression 2)

$$|f_{11}/f_{12}|=0.544$$

(Values concerning conditional expression 3)

$$n_2-n_1=0.061$$

(Values concerning conditional expression 4)

$$OP/2Y=1.03$$

$r_1=1.49735$ (aspherical surface)
  $d_1=0.834$ $nd_1=1.525$ $vd_1=56.2$
$r_2=-7.32267$
  $d_2=0.500$ $nd_2=1.585$ $vd_2=29.9$
$r_3=4.22544$ (aspherical surface)
  $d_3=0.119$
$r_4=\infty$ (diaphragm aperture)
  $d_4=0.817$
$r_5=-1.45112$ (aspherical surface)
  $d_5=0.808$ $nd_3=1.585$ $vd_3=29.9$
$r_6=-3.70243$ (aspherical surface)
  $d_6=0.322$
$r_7=3.96134$ (aspherical surface)
  $d_7=1.005$ $nd_4=1.525$ $vd_4=56.2$
$r_8=13.50798$ (aspherical surface)
  $d_8=0.350$
$r_9=\infty$
  $d_9=0.300$ $nd_5=1.518$ $vd_5=59.0$
$r_{10}=\infty$
  $d_{10}=1.112$
$r_{11}=\infty$ (image plane)
Constant of the cone (K) and Aspherical surface coefficient ($A_3, A_4, A_5, A_6, A_7, A_8, A_9, A_{10}, A_{11}, A_{12}, A_{13}, A_{14}, A_{15}, A_{16}$)
(first surface)
$K=0.03987,$
$A_3=-1.353\times10^{-2}, A_4=8.776\times10^{-3},$
$A_5=-2.661\times10^{-3}, A_6=-3.527\times10^{-3},$
$A_7=-2.619\times10^{-4}, A_8=9.324\times10^{-4},$
$A_9=4.457\times10^{-5}, A_{10}=-4.966\times10^{-4},$
$A_{11}=-4.100\times10^{-4}, A_{12}=-2.826\times10^{-4},$
$A_{13}=-1.023\times10^{-4}, A_{14}=6.865\times10^{-6},$
$A_{15}=0, A_{16}=0$
(third surface)
$K=3.80487,$
$A_3=-1.857\times10^{-2}, A_4=-4.372\times10^{-3},$
$A_5=2.865\times10^{-2}, A_6=2.531\times10^{-2},$
$A_7=4.069\times10^{-3}, A_8=-2.507\times10^{-2},$
$A_9=-4.423\times10^{-2}, A_{10}=-1.167\times10^{-1},$
$A_{11}=-2.360\times10^{-2}, A_{12}=8.326\times10^{-2},$
$A_{13}=6.333\times10^{-2}, A_{14}=1.093\times10^{-1},$
$A_{15}=0, A_{16}=0$
(fifth surface)
$K=0.02922,$
$A_3=-4.653\times10^{-2}, A_4=1.952\times10^{-3},$
$A_5=-5.207\times10^{-2}, A_6=-1.423\times10^{-1},$
$A_7=-4.992\times10^{-2}, A_8=-3.308\times10^{-2},$
$A_9=5.644\times10^{-2}, A_{10}=9.454\times10^{-2},$
$A_{11}=7.390\times10^{-2}, A_{12}=2.442\times10^{-2},$
$A_{13}=-8.387\times10^{-2}, A_{14}=-1.935\times10^{-1},$
$A_{15}=0, A_{16}=0$
(sixth surface)

Figure 32:
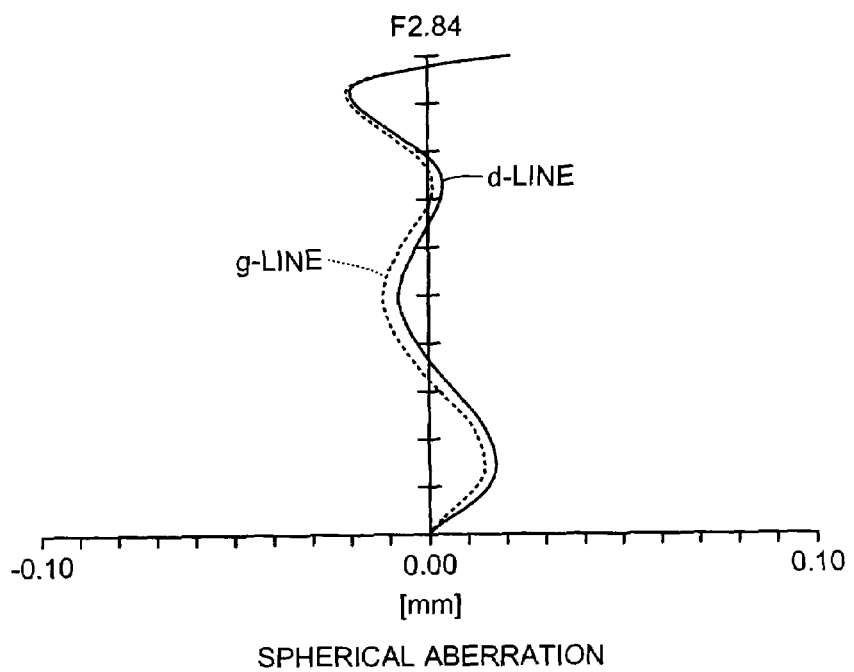
FIG. 32 is a spherical aberration diagram of the image lens according to the eleventh embodiment.
Figure 33:
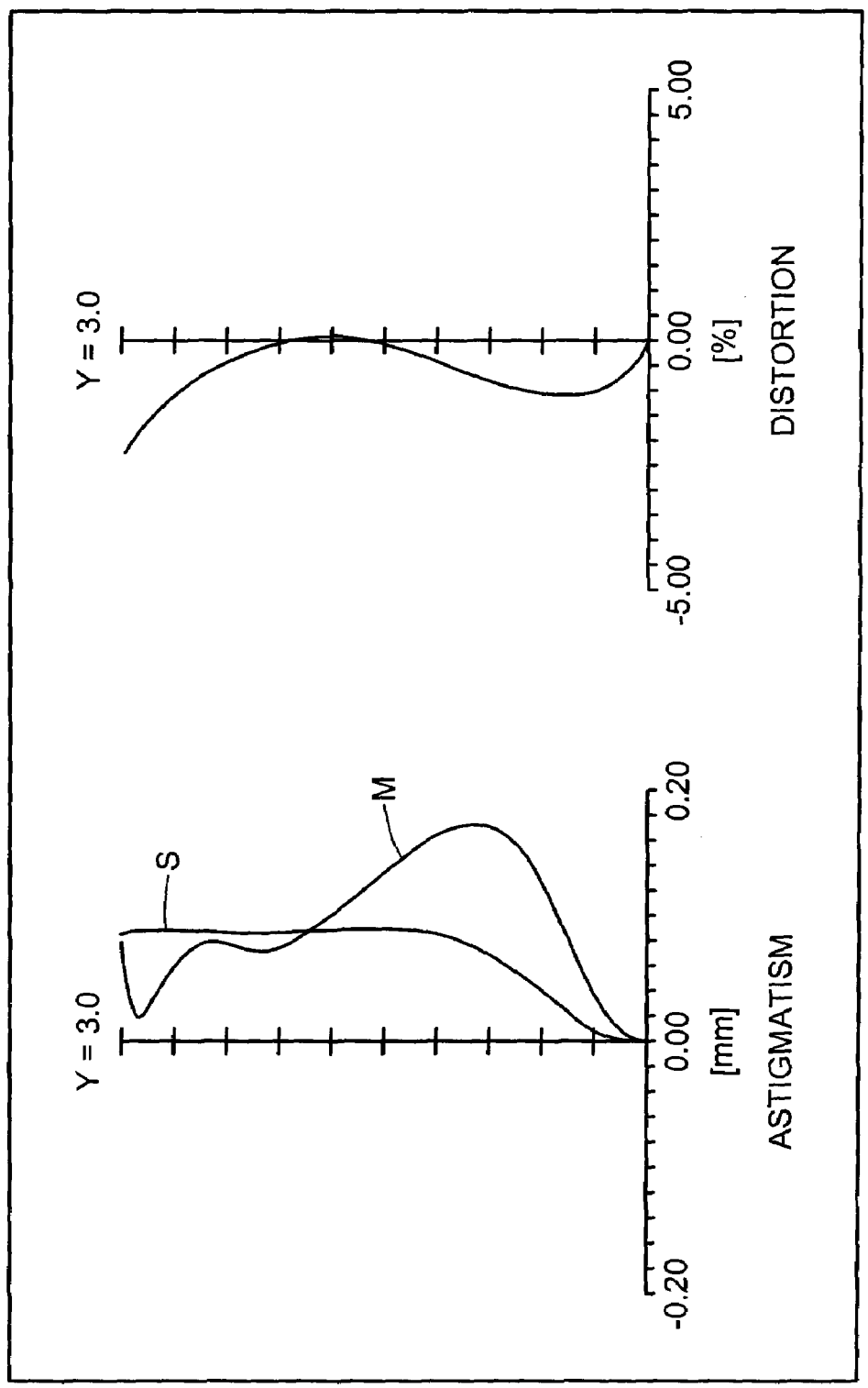
FIG. 33 is an astigmatism diagram in d-line (λ=587.56 nm) and a distortion diagram of the imaging lens according to the eleventh embodiment.

K=1.22120,
$A_3 = -6.625 \times 10^{-2}$, $A_4 = -3.120 \times 10^{-2}$,
$A_5 = 5.154 \times 10^{-3}$, $A_6 = -2.099 \times 10^{-2}$,
$A_7 = 5.391 \times 10^{-3}$, $A_8 = 7.214 \times 10^{-3}$,
$A_9 = 1.780 \times 10^{-3}$, $A_{10} = 1.782 \times 10^{-3}$,
$A_{11} = -6.889 \times 10^{-4}$, $A_{12} = -6.510 \times 10^{-4}$,
$A_{13} = 5.390 \times 10^{-4}$, $A_{14} = 4.584 \times 10^{-6}$,
$A_{15} = 0$, $A_{16} = 0$
(seventh surface)
K=−81.82737,
$A_3 = 6.786 \times 10^{-3}$, $A_4 = -3.301 \times 10^{-2}$,
$A_5 = -5.191 \times 10^{-3}$, $A_6 = -6.895 \times 10^{-3}$,
$A_7 = 1.588 \times 10^{-3}$, $A_8 = 2.108 \times 10^{-3}$,
$A_9 = 1.199 \times 10^{-3}$, $A_{10} = 1.025 \times 10^{-3}$,
$A_{11} = -4.454 \times 10^{-4}$, $A_{12} = -3.274 \times 10^{-4}$,
$A_{13} = -1.640 \times 10^{-4}$, $A_{14} = 1.154 \times 10^{-4}$,
$A_{15} = 0$, $A_{16} = 0$
(eighth surface)
K=2.12700,
$A_3 = -1.094 \times 10^{-2}$, $A_4 = -1.213 \times 10^{-2}$,
$A_5 = -5.147 \times 10^{-3}$, $A_6 = -7.867 \times 10^{-4}$,
$A_7 = -1.224 \times 10^{-4}$, $A_8 = -1.397 \times 10^{-4}$,
$A_9 = 1.445 \times 10^{-4}$, $A_{10} = -1.892 \times 10^{-5}$,
$A_{11} = 2.527 \times 10^{-5}$, $A_{12} = 1.377 \times 10^{-5}$,
$A_{13} = -4.789 \times 10^{-6}$, $A_{14} = -3.417 \times 10^{-6}$,
$A_{15} = 0$, $A_{16} = 0$ FIG. 32 is a spherical aberration diagram of the image lens according to the eleventh embodiment. FIG. 33 is an astigmatism diagram in d-line (λ=587.56 nm) and a distortion diagram of the imaging lens according to the eleventh embodiment. In the astigmatism diagram, S is the sagittal image surface; M is the meridional image surface.

Further in the above numeric data, $r_1, r_2 \ldots$ respectively represent radii of curvature of the lens surfaces; $d_1, d_2 \ldots$ respectively represent the thicknesses of the lenses or surface intervals thereof; $nd_1, nd_2 \ldots$ respectively represent refractive indexes in d-line (λ=587.56 nm); $vd_1, vd_2 \ldots$ respectively represent Abbe numbers in d-line (λ=587.56 nm) of lenses.

Further, each of the above aspherical surfaces can be expressed by the following equation, where with respect to the vertex as a point of reference, H is the height perpendicular to the optical axis, X(H) is the change in H along the direction of optical axis.

$$X(H) = \frac{H^2/R}{1 + \sqrt{1 - (K+1)H^2/R^2}} + A_3 H^3 + A_4 H^4 + A_5 H^5 + A_6 H^6 + A_7 H^7 + A_8 H^8 + A_9 H^9 + A_{10} H^{10} + A_{11} H^{11} + A_{12} H^{12} + A_{13} H^{13} + A_{14} H^{14} + A_{15} H^{15} + A_{16} H^{16}$$

R represents paraxial radii of curvature, K represents constant of the cone, $A_3, A_4, A_5, A_6, A_8, A_9, A_{10}, A_{11}, A_{12}, A_{13}, A_{14}, A_{15}, A_{16}$ represent $3^{rd}, 4^{th}, 5^{th}, 6^{th}, 7^{th}, 8^{th}, 9^{th}, 10^{th}, 11^{th}, 12^{th}, 13^{th}, 14^{th}, 15^{th}, 16^{th}$ aspherical coefficients, respectively.

As explained above, the imaging lens according to the present invention has the above characteristics and enables the provision of a small, low-cost, and light-weight imaging lens having a high optical performance satisfying the high pixel formation of an imaging element, even when lens formed of resin is included.

Further, by preferably using a lens having an aspherical surface, various aberrations can be corrected more effectively, while achieving a smaller and lighter optical system, and reducing production costs.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2008-156614 filed in Japan on Jun. 16, 2008, and Japanese priority document, 2009-100022 filed in Japan on Apr. 16, 2009.

What is claimed is:

1. An imaging lens comprising:
a first lens group that includes sequentially from an object side, a first lens formed of resin and having a positive refractive power and a second lens formed of resin and having a negative refractive power, the first lens and the second lens collectively forming a cemented lens having a positive refractive power;
a second lens group that includes a negative lens;
a third lens group that includes a positive lens, wherein the first lens group, the second lens group, and the third lens group are sequentially arranged from the object side,
wherein a condition:

$$0.5 < f_1/f < 1.0$$

is satisfied, where $f_1$ represents a focal length of the first lens group and f represents a focal length of the imaging lens.

2. The imaging lens according to claim 1, wherein conditions:

$$0.3 < |f_{11}/f_{12}| < 1.0;$$

and $$0 < n_2 - n_1$$

are satisfied, where $f_{11}$ represents a focal length of the first lens of the first lens group, $f_{12}$ represents a focal length of the second lens of the first lens group, $n_1$ represents a refractive index at a d-line of the first lens of the first lens group, and $n_2$ represents a refractive index at a d-line of the second lens of the first lens group.

3. The imaging lens according to claim 1, wherein a condition:

$$OP/2Y < 2.0$$

is satisfied, where OP represents an overall length of the imaging lens, and 2Y represents a diameter of an effective image circle of the imaging lens.

4. The imaging lens according to claim 1, wherein at least one lens surface is aspherical.

5. The imaging lens according to claim 1, wherein a lens formed of resin is used for the second lens group.

6. The imaging lens according to claim 1, wherein a lens formed of resin is used for the third lens group.

7. An imaging lens comprising:
a first lens group that includes sequentially from an object side, a first lens formed of resin and having a positive refractive power and a second lens formed of resin and having a negative refractive power, the first lens and the second lens collectively forming a cemented lens having a positive refractive power;
a second lens group that includes a negative lens;
a third lens group that includes a positive lens, wherein the first lens group, the second lens group, and the third lens group are sequentially arranged from the object side, wherein conditions:

$$0.3 < |f_{11}/f_{12}| < 1.0; \text{ and}$$

$$0 < n_2 - n_1$$

are satisfied, where $f_{11}$ represents a focal length of the first lens of the first lens group, $f_{12}$ represents a focal length of the second lens of the first lens group, $n_1$ represents a refractive index at a d-line of the first lens of the first lens group, and $n_2$ represents a refractive index at a d-line of the second lens of the first lens group.

8. An imaging lens comprising:
a first lens group that includes sequentially from an object side, a first lens formed of resin and having a positive refractive power and a second lens formed of resin and having a negative refractive power, the first lens and the second lens collectively forming a cemented lens having a positive refractive power;
a second lens group that includes a negative lens;
a third lens group that includes a positive lens, wherein the first lens group, the second lens group, and the third lens group are sequentially arranged from the object side, wherein a condition:

$$OP/2Y < 2.0$$

is satisfied, where OP represents an overall length of the imaging lens, and 2Y represents a diameter of an effective image circle of the imaging lens.

\* \* \* \* \*